US012726243B2

(12) United States Patent
Lin et al.

(10) Patent No.: US 12,726,243 B2
(45) Date of Patent: Sep. 1, 2026

(54) ENHANCED CHANNEL SOUNDING PROTOCOLS FOR WLAN SYSTEMS

(71) Applicant: INTERDIGITAL PATENT HOLDINGS, INC., Wilmington, DE (US)

(72) Inventors: Zinan Lin, Basking Ridge, NJ (US); Mahmoud Saad, Montreal (CA); Hanqing Lou, Syosset, NY (US); Rui Yang, Greenlawn, NY (US); Xiaofei Wang, North Caldwell, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 254 days.

(21) Appl. No.: 18/571,336

(22) PCT Filed: Jun. 20, 2022

(86) PCT No.: PCT/US2022/034161

§ 371 (c)(1),
(2) Date: Dec. 18, 2023

(87) PCT Pub. No.: WO2022/266531

PCT Pub. Date: Dec. 22, 2022

(65) Prior Publication Data

US 2024/0275445 A1 Aug. 15, 2024

Related U.S. Application Data

(60) Provisional application No. 63/212,329, filed on Jun. 18, 2021, provisional application No. 63/252,854, filed on Oct. 6, 2021.

(51) Int. Cl.
*H04B 7/06* (2006.01)
*H04W 84/12* (2009.01)

(52) U.S. Cl.
CPC ......... *H04B 7/0617* (2013.01); *H04B 7/0634* (2013.01); *H04W 84/12* (2013.01)

(58) Field of Classification Search
CPC .... H04B 7/0617; H04B 7/0634; H04B 7/063; H04B 7/0639; H04B 7/088; H04B 7/0413;

(Continued)

(56) References Cited

U.S. PATENT DOCUMENTS

| | | | |
|---|---|---|---|
| 9,215,755 | B2 | 12/2015 | Saur et al. |
| 10,439,699 | B2 | 10/2019 | Yu et al. |

(Continued)

FOREIGN PATENT DOCUMENTS

| | | |
|---|---|---|
| WO | 2019/213565 | 11/2019 |
| WO | 2022/148250 | 7/2022 |

OTHER PUBLICATIONS

AU, "Compendium of straw polls and potential changes to the Specification Framework Document," IEEE 802.11-20/0566r59 (Aug. 20, 2020).

(Continued)

*Primary Examiner* — Abdullahi Ahmed
(74) *Attorney, Agent, or Firm* — Volpe Koenig

(57) ABSTRACT

Methods and apparatuses for Multi-AP channel sounding for Wireless Area Networks (WLAN) are disclosed. A method performed by a beamformee may compromise: receiving, from a beamformer, a null data packed (NDP) announcement frame (NDPA); receiving, from the beamformer, an NDP frame; receiving, from the beamformer, an enhanced beamforming request poll (BFRP) trigger frame including an indication of a feedback format; and transmitting, to the beamformer based on the NDP and NDPA, using a format indicated by the feedback format of the BFRP trigger frame, a feedback frame including a feedback report. The trigger (Continued)

frame may be an enhanced beamforming report poll (BFRP) trigger frame. The feedback report may be a beamforming report or a vector index (VI) feedback report. The beamformer may be an access point (AP) and the beamformee may be a station (STA).

20 Claims, 22 Drawing Sheets

(58) Field of Classification Search
CPC ... H04B 7/0626; H04W 84/12; H04L 25/0224
See application file for complete search history.

(56) References Cited

U.S. PATENT DOCUMENTS

| | | | | |
|---|---|---|---|---|
| 11,108,439 | B2* | 8/2021 | Seok | H04B 7/024 |
| 11,483,048 | B2 | 10/2022 | Yu et al. | |
| 12,206,470 | B2 | 1/2025 | Aio et al. | |
| 2014/0093005 | A1 | 4/2014 | Xia et al. | |
| 2018/0323837 | A1 | 11/2018 | Park et al. | |
| 2019/0037556 | A1 | 1/2019 | Seok | |
| 2020/0336176 | A1 | 10/2020 | Seok et al. | |
| 2020/0403680 | A1* | 12/2020 | Li | H04B 7/0632 |
| 2022/0021560 | A1* | 1/2022 | Roy | H04L 25/0224 |
| 2022/0103208 | A1* | 3/2022 | Yu | H04L 5/0023 |
| 2022/0200673 | A1* | 6/2022 | Ksairi | H04B 7/0421 |
| 2023/0327717 | A1* | 10/2023 | Minotani | H04W 76/11 370/329 |
| 2024/0030974 | A1* | 1/2024 | Jeon | H04B 7/0456 |
| 2024/0195461 | A1* | 6/2024 | Yu | H04B 7/0617 |
| 2024/0306005 | A1* | 9/2024 | He | H04B 7/0626 |

OTHER PUBLICATIONS

AU, "Specification Framework for TGbe," 802.11-19/1262r8 (Feb. 2020).
Cariou, "802.11 EHT Proposed PAR," IEEE P802.11 Wireless LANs, IEEE 802.11-18/1231r4 (Jan. 2019).
Cariou, "IEEE 802.11 EHT draft Proposed CSD," IEEE P802.11 Wireless LANs, IEEE 802.11-18/1233r4 (Jan. 2019).
Chen, "CR for 11be D1.0," IEEE 802.11-21/1229r3 (Jul. 2021).
Chu et al., "Trigger Consideration," IEEE 802.11-20/0764r1 (May 12, 2020).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D1.0 (May 2021).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D6.0 (Nov. 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Jia et al., "Multi-AP Sounding Discussion," IEEE 802.11-20/0052 (Dec. 30, 2019).
Nabetani et al., "A Novel Low-Overhead Channel Sounding Protocol for Downlink Multi-User MIMO in IEEE 802.11ax WLAN," (Mar. 2018).
Stacey, "CR on differentiating non-TB and TB sounding," IEEE 802.11-18/1502r1 (Sep. 2018).
Yokota et al., "ASIP Implementation of CSI Feedback and Low Complexity Precoding for MU-MIMO System," (Feb. 2016).
Yu et al., "Sounding procedure in AP collaboration," IEEE 802.11-19/1097r0 (Jul. 2019).

* cited by examiner

Figure 3:
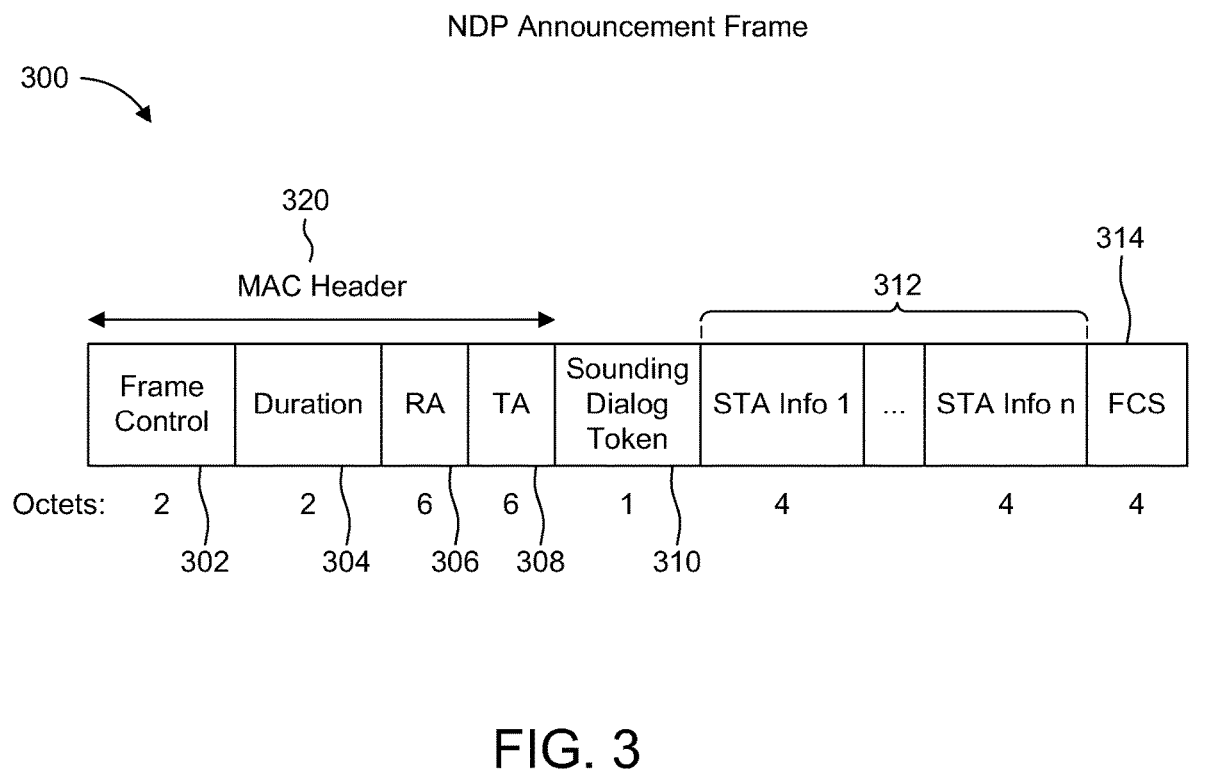

NDP Announcement Frame

300

320

MAC Header

312

314

| Frame Control | Duration | RA | TA | Sounding Dialog Token | STA Info 1 | ... | STA Info n | FCS |
|---|---|---|---|---|---|---|---|---|
| 2 | 2 | 6 | 6 | 1 | 4 | | 4 | 4 |

Octets:

ENHANCED CHANNEL SOUNDING PROTOCOLS FOR WLAN SYSTEMS

CROSS-REFERENCE TO RELATED APPLICATIONS

This application is the U.S. National Stage, under 35 U.S.C. § 371, of International Application No. PCT/US2022/034161 filed Jun. 20, 2022, which claims the benefit of U.S. Provisional Application No. 63/212,329, filed Jun. 18, 2021, and U.S. Provisional Application No. 63/252,854, filed Oct. 6, 2021, the contents of which are incorporated herein by reference.

SUMMARY

Methods and apparatuses for Multi Access Point (MAP or multi-AP) channel sounding for Wireless Area Networks (WLAN) are disclosed. A method performed by a beamformee may compromise: receiving, from a beamformer, a null data packed (NDP) announcement (NDPA) frame; receiving, from the beamformer, an NDP frame; receiving, from the beamformer, an enhanced beamforming request poll (BFRP) trigger frame including an indication of a feedback format; and transmitting, to the beamformer based on the NDP and NDPA, using a format indicated by the feedback format of the BFRP trigger frame, a feedback frame including a feedback report. The trigger frame may be an enhanced beamforming report poll (BFRP) trigger frame. The feedback report may be a beamforming report or a vector index (VI) feedback report. The beamformer may be an access point (AP) and the beamformee may be a station (STA).

A method performed by a beamformer may compromise: transmitting a null data packed (NDP) announcement frame (NDPA); transmitting a NDP frame; transmitting a first enhanced beamforming request poll (BFRP) trigger frame including an indication of a feedback format; receiving, from a first set of beamformees, one or more beamforming reports based on the indication of the feedback format; transmitting a second enhanced beamforming request poll (BFRP) trigger frame including an indication of a feedback format; and receiving, from a second set of beamformees, one or more feedback reports based on the indication of the feedback format. The feedback report may be a VI feedback report. The beamformer may be an access point (AP) and the beamformee may be a station (STA).

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 3 illustrates an example of a High Efficiency (HE) Null Data Packet (NDP) Announcement frame format;

DETAILED DESCRIPTION

Figure 1A:
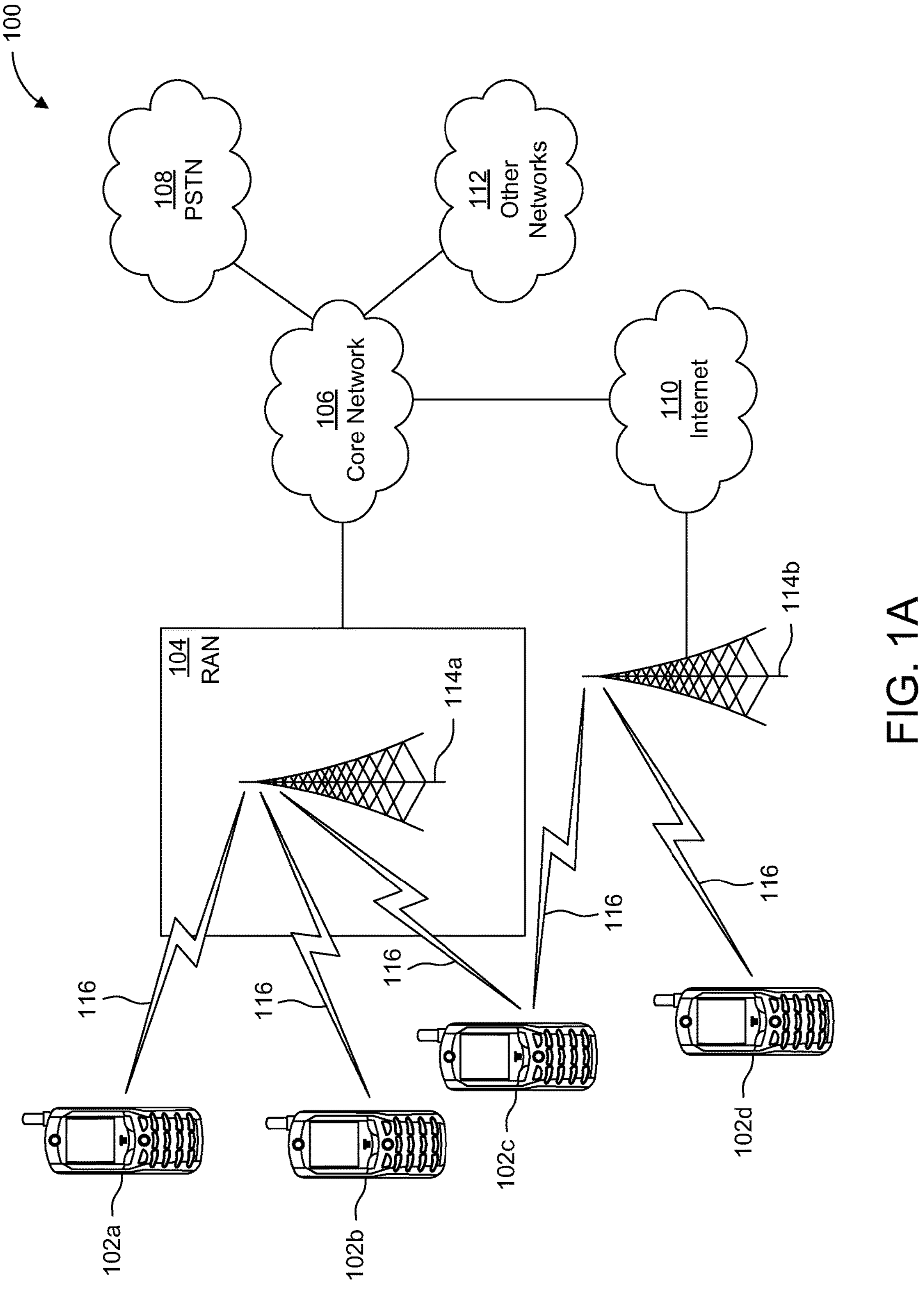
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
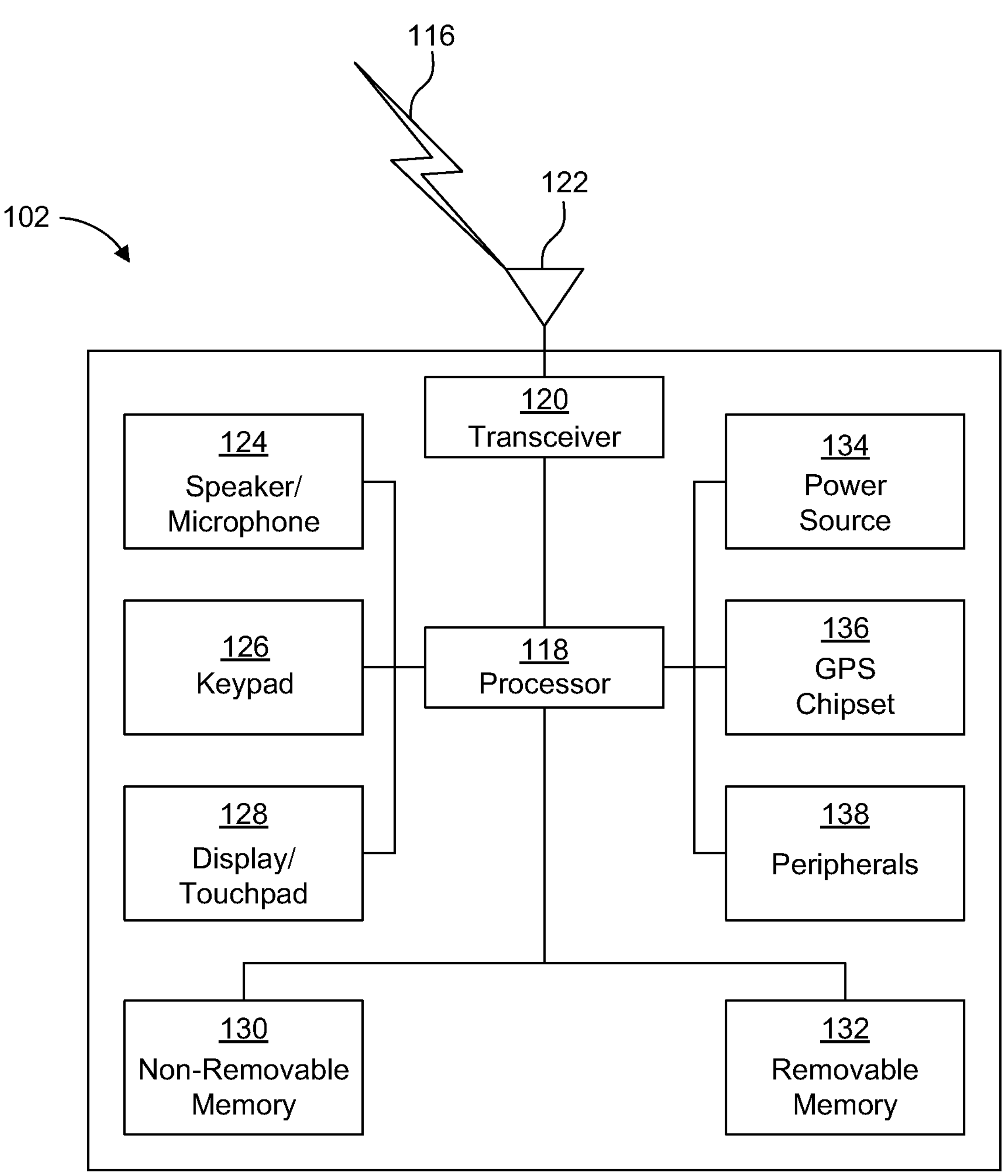
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
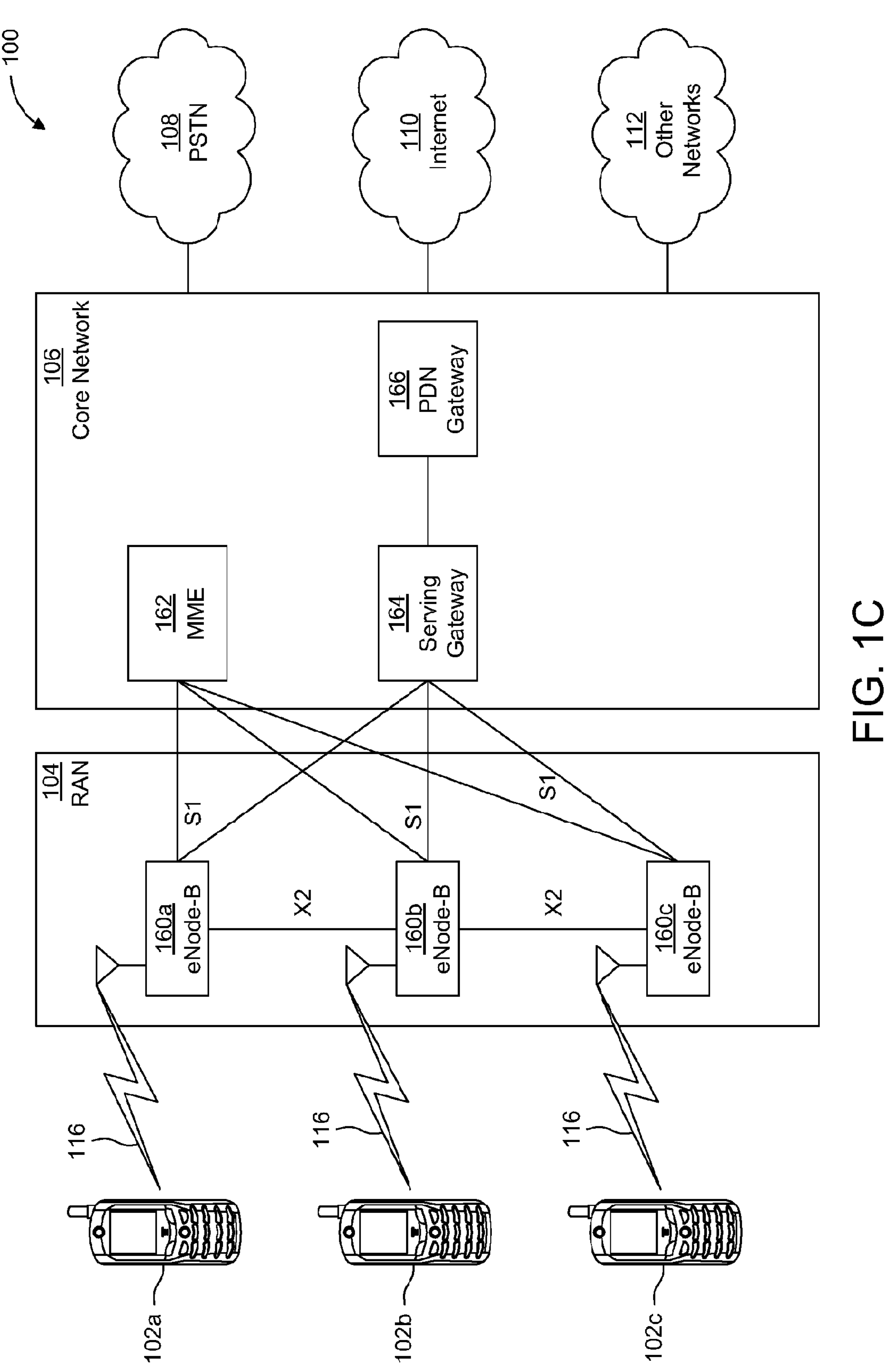
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
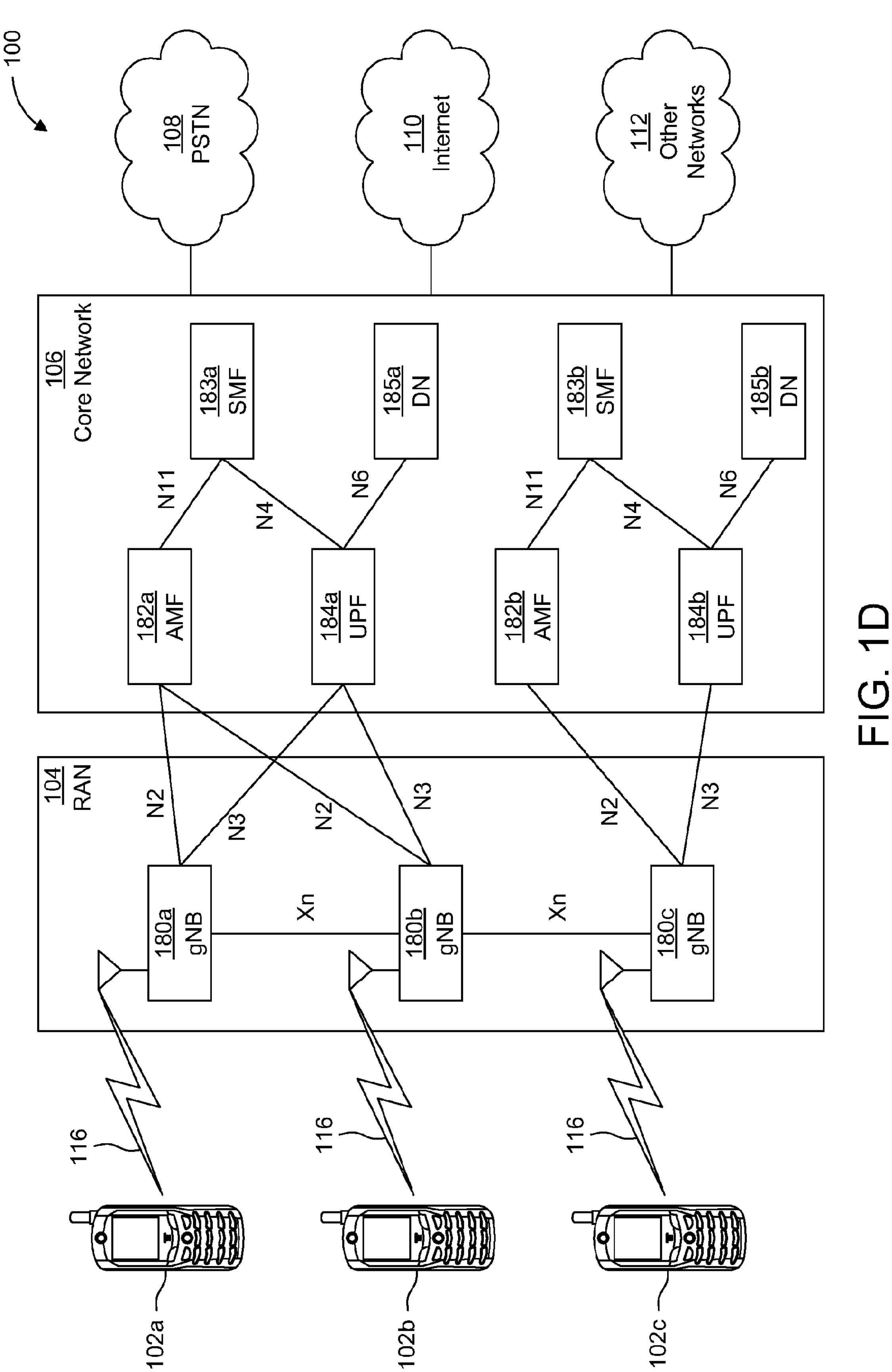
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A Wireless Local Area Network (WLAN) in an Infrastructure Basic Service Set (BSS) mode may include an Access Point (AP) for the BSS and one or more stations (STAs) associated with the AP. The AP may have access or interface with a Distribution System (DS) or another type of wired/wireless network that carries traffic in and out of the BSS. Traffic to the STAs that originates from outside the BSS and arrive through the AP, may be delivered to the STAs. Traffic originating from STAs to destinations outside the BSS may be sent to the AP to be delivered to the respective destinations. Traffic between STAs within the BSS may also be sent through the AP where the source STA sends traffic to the AP and the AP delivers the traffic to the destination STA.

In accordance with the Institute of Electronics and Electrical Engineers (IEEE) 802.11 standards for infrastructure mode of operation, such as 802.11ac and/or 802.11ax, an AP may transmit a beacon on a fixed channel, usually the primary channel. This channel may be 20 MHz wide, and may be the operating channel of the BSS. This channel may also be used by the STAs to establish a connection with the AP. The fundamental channel access mechanism in an 802.11 system may be Carrier Sense Multiple Access with Collision Avoidance (CSMA/CA). In this mode of operation, some STAs, or every STA, including the AP, may sense the primary channel. If the channel is detected to be busy, the STA may back off. Hence, one STA may transmit at any given time in a BSS.

In embodiments operating according to 802.11n standards, High Throughput (HT) STAs may also use a 40 MHz wide channel for communication. This may be achieved by combining the primary 20 MHZ channel, with an adjacent 20 MHz channel to form a 40 MHz wide contiguous channel.

In embodiments operating according to 802.11ac standards, Very High Throughput (VHT) STAs may support 20 MHz, 40 MHZ, 80 MHZ, and/or 160 MHz wide channels. The 40 MHz and 80 MHZ, channels may be formed by combining contiguous 20 MHz channels similar to 802.11n described above. A160 MHZ channel may be formed either by combining 8 contiguous 20 MHz channels, or by combining two non-contiguous 80 MHz channels, which may also be referred to as an 80+80 configuration. For the 80+80 configuration, the data, after channel encoding, may be passed through a segment parser that divides it into two streams. The Inverse Discrete Fourier Transformation (IDFT) operation and time domain processing may be done on each stream separately. The streams may then mapped be on to the two channels, and the data may be transmitted. At the receiver, this mechanism may be reversed, and the combined data may be sent to the MAC.

To improve spectral efficiency, systems operating in accordance with 802.11ac standards may implement the concept of downlink Multi-User MIMO (MU-MIMO) transmissions from an AP to multiple STAs in the same symbol's time frame, e.g. during a downlink OFDM symbol. The potential for the use of downlink MU-MIMO may also be considered for embodiments operating in accordance with 802.11ah standards. It is important to note that since downlink MU-MIMO, as it is used in 802.11ac, may use the same symbol timing for transmissions to multiple STAs, interference of the waveform transmissions to multiple STA's may not be an issue. However, all STA's involved in MU-MIMO transmission from the AP may need to use the same channel or band, and this may limit the operating bandwidth to the smallest channel bandwidth that is supported by the STAs that are included as destinations of the MU-MIMO transmission from the AP.

The IEEE 802.11 Extremely High Throughput (EHT) Study Group was formed in September 2018. EHT developments may provide one basis for the next major revision to IEEE 802.11 standards following 802.11ax. The EHT study group explores the possibility to further increase peak throughput and improve efficiency of IEEE 802.11 networks. Following the establishment of the EHT Study Group, the 802.11be Task Group was also established to provide 802.11 EHT specifications. Use cases and applications addressed include high throughput and low latency applications, such as: Video-over-WLAN; Augmented Reality (AR); and Virtual Reality (VR). A list of features that has been discussed in the EHT SG and 802.11be to achieve the target of increased peak throughput and improved efficiency includes: multi-AP; multi-Band/multi-link; 320 MHz bandwidth; 16 Spatial Streams; HARQ; AP Coordination; and new designs for 6 GHz channel access. The IEEE Standard board approved the IEEE 802.11be Task Group (TG) based on a Project Authorization Request (PAR) and Criteria for Standards Development (CSD) developed by the EHT study group.

EHT STAs use the EHT sounding protocol to determine the channel state information. The EHT sounding protocol provides explicit feedback mechanisms, defined as EHT non-trigger-based (non-TB) sounding and EHT trigger-based (TB) sounding, where the EHT beamformee measures the channel using a training signal (i.e., an EHT sounding NDP) transmitted by the EHT beamformer and sends back a transformed estimate of the channel state. The EHT beamformer uses this estimate to derive the steering matrix.

The EHT beamformee returns an estimate of the channel state in an EHT compressed beamforming/CQI report carried in one or more EHT Compressed Beamforming/CQI frames. There are three types of EHT compressed beamforming/CQI report: (1) SU feedback; (2) MU feedback; and (3) CQI feedback.

In SU feedback, the EHT compressed beamforming/CQI report consists of an EHT compressed beamforming report field. In MU feedback, the EHT compressed beamforming/CQI report consists of an EHT compressed beamforming report field and EHT MU exclusive beamforming report field. In CQI feedback, the EHT compressed beamforming/CQI report consists of an EHT CQI report field.

Coordinated multi-AP (C-MAP) transmissions will be supported in 802.11be. The schemes that having been discussed include: (1) coordinated multi-AP OFDMA; (2) coordinated multi-AP TDMA; (3) coordinated multi-AP spatial reuse; (4) coordinated beamforming/nulling; and (5) joint transmission.

In the context of coordinated multi-AP, several terminologies have been defined, including: (1) sharing AP; (2) shared AP; and (3) AP candidate set. In sharing AP, an EHT AP obtains a TXOP and initiates the multi-AP coordination. In shared AP, an EHT AP is coordinated for the multi-AP transmission by the sharing AP. In an AP candidate set, a set of APs may initiate or participate in multi-AP coordination.

802.11be standards may support mechanisms to determine whether an AP is part of an AP candidate set and can participate as a shared AP in coordinated multi-AP transmission initiated by a sharing AP. Procedures may need to be defined for an AP to share its frequency/time resources of an obtained TXOP with a set of APs. An AP that intends to use the resource (i.e., frequency or time) shared by another AP may be able to indicate its resource needs to the AP that shared the resource. Coordinated OFDMA may be supported in 11be, and in a coordinated OFDMA, both DL OFDMA and its corresponding UL OFDMA acknowledgement may be allowed.

Further details relating to multi-AP channel sounding in accordance with 802.11be standards are described herein. Channel sounding in accordance with 802.11n and 802.11ac standards may be performed using two different schemes, generally termed explicit channel sounding and implicit channel sounding. In explicit channel sounding, the AP may transmit an NDP to the STA with a preamble that allows the STA to measure its own channel and send CSI feedback to the AP. In implicit channel sounding, the STA may send an NDP, and the AP may measure the channel of the STA assuming that the channel is reciprocal.

802.11be may support a maximum number (for example, 16) of spatial streams for SU-MIMO and for MU-MIMO. The maximum number of spatial streams allocated to each MU-MIMO scheduled non-AP STA may be limited (e.g., to 4). The maximum number of users for which DL transmissions may be spatially multiplexed may be, for example, 8 per resource block (RU).

802.11be may support two or more modes of channel sounding in multiple-AP systems. Two of these modes of channel sounding may be sequential sounding and joint sounding. In sequential sounding, each AP may transmit an NDP independently without an overlapped sounding period of each AP. In other words, each AP performs sounding in its own time period, and these sounding time periods may then be called sequential. In joint sounding, where an AP has less than or equal to a total of 8 antennas active on all LTF tones and uses 802.11ax P-matrix across OFDM symbols. In other words, joint sounding in a multiple-AP system includes an AP having 8 or fewer antennas may have all antennas active on all LTF tones and use an 802.11ax P-matrix to send/receive sounding signals.

CSI feedback collection may be performed using an 802.11ax-like four-step sounding sequence ((Null Data Packet Announcement (NDPA)+NDP+Beamforming Report Poll (BFRP) Trigger frame+CSI report) in a multiple-AP system to collect the feedback from both in-BSS and overlapping BSS (OBSS) STAs. In other words, this four-step process may be used to obtain sounding feedback from STAs in a BSS operated by an AP, and STAs in an overlapping BSS that are not associated with that same AP. In sequential sounding for multiple-AP systems, a STA may process an NDPA frame and the BFRP Trigger frame received from an OBSS AP, and the STA may respond with corresponding CSI to the OBSS AP, if polled with a BFRP TF from the OBSS AP.

Figure 2:
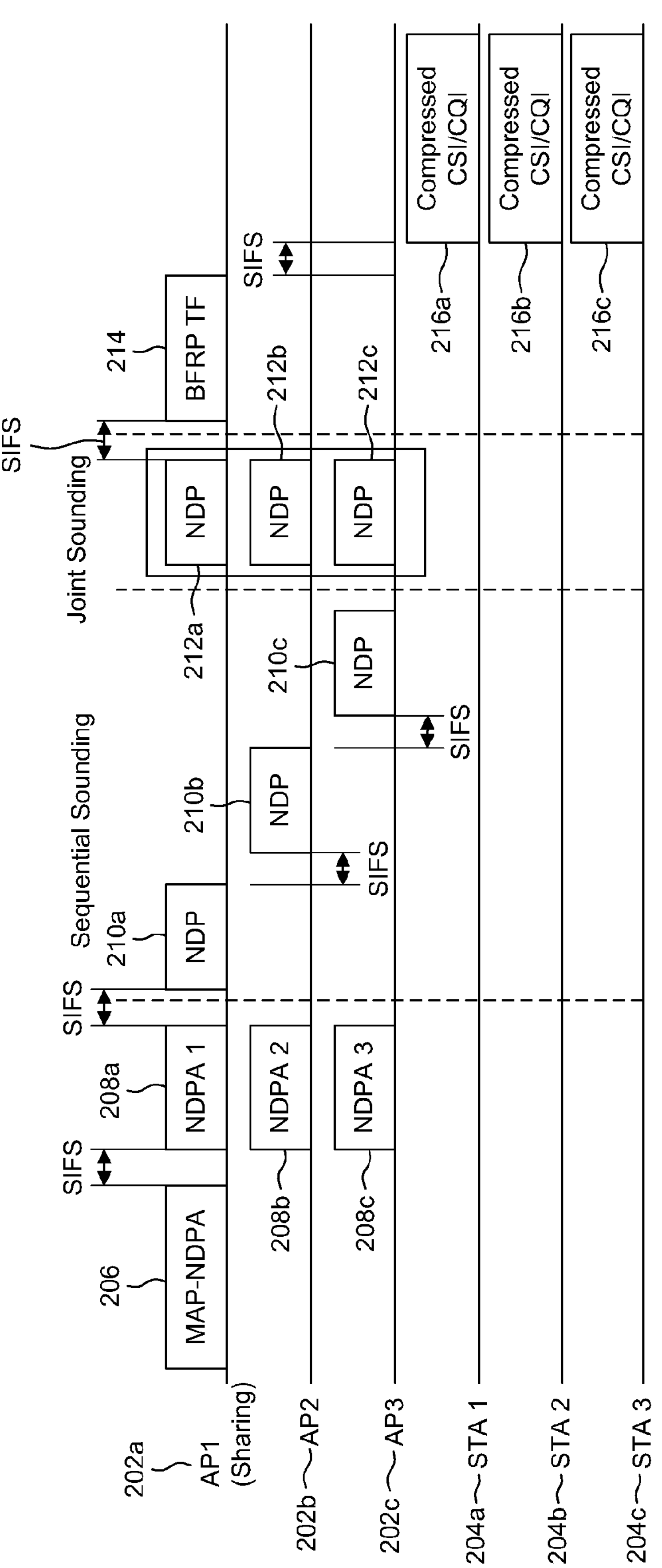
FIG. 2 illustrates examples of sequential channel sounding procedures and joint channel sounding procedures performed in a multi-AP system.

FIG. 2 illustrates a signal flow diagram showing examples of both a sequential channel sounding procedure and a joint channel sounding procedure performed in a multi-AP system. To start either process, in one example, the sharing AP (AP1 202*a*) transmits a multi-AP NDPA (MAP-NDPA) 206, then each AP in the coordinating group (AP1 202*a*, AP2 202*b*, and AP3 202*c*) may transmit an NDPA (AP1 202*a* transmits NDPA 208*a*, AP2 202*b* transmits NDPA 208*b*, and AP3 202*c* transmits NDPA 208*c*). After the sounding procedure (either joint or sequential), AP1 202*a* transmits a beamforming report poll (BFRP) Trigger frame. NDPA 208*a*, 208*b*, and 208*c* may have the format illustrated in FIG. 3, which is described in more detail below. The BFRP Trigger frame may have the format illustrated in FIG. 5, which is described in more detail below.

In the sequential sounding scheme, each AP in the coordinating group (AP1 202*a*, AP2 202*b*, and AP3 202*c*) may transmit its respective NDP (NDP 210*a*, NDP 210*b*, and NDP 210*c*) in a different non-overlapped time to all the STAs 204*a*, 204*b*, and 204*c* in the coordinating group (i.e. time-multiplexed). In this scenario, each NDP 210*a*, 210*b*, and 210*c* may be separated by a short interframe space (SIFS) time interval.

In a joint sounding scheme, the coordinated APs (AP1 202*a*, AP2 202*b*, and AP3 202*c*) may each transmit its respective NDP (NDP 210*a*, NDP 210*b*, and NDP 210*c*) simultaneously where different Long Training Field (LTF) tones are either spanning the entire bandwidth and multiplexed spatially or using orthogonal codes. Otherwise, each AP (AP1 202*a*, AP2 202*b*, and AP3 202*c*) may transmit their respective LTF tones only on selected tones such that there is no overlap in tones amongst the APs. STAs that receive the NDP frames (STA1 204*a*, STA2 204*b*, and STA3 204*c*) may then determine CSI or CQI and transmit that information in a feedback report 216*a*, 216*b*, and 216*c* back to one of the APs in the coordinating group (AP1 202*a*, AP2 202*b*, or AP3 202*c*).

The MAP-NDPA 206 may notify all APs (AP1 202*a*, AP2 202*b*, and AP3 202*c*) to send a respective NDPA (NDPA 1 208*a*, NDPA 2 208*b*, and NDPA 3 208*c*) to the associated STAs (STA 1 204*a*, STA 2 204*b*, and STA 3 204*c*) The MAP-NDPA 206 may include the sounding information required for different APs. For example, the sounding information may include feedback type, sounding subchannels or RUs (which subchannels or RUs need to be sounded for feedback), sounding bandwidth.

The APs may transmit the NDPA to solicit channel feedback from their associated STAs. The NDPA may indicate the feedback type and grouping information, the requested subchannels for feedback, the codebook size, the requested STA address, etc. Different STA may be requested for feedback for different subchannels.

The APs may transmit the NDP to the requested STAs that analyze the training fields included in the NDP to calculate the channel response.

When a STA (such as STA1 204*a*, STA2 204*b*, and STA3 204*c* in FIG. 2) receives an NDP, it measures the channel and prepares the CSI feedback report. Different ways are proposed to collect the CSI from the STAs. In one method, each AP collects all CSI which includes the feedback of the in-BSS and OBSS stations. In another method, each AP collects CSI from its associated STAs only. In another method, the Sharing AP (AP1 202*a* in FIG. 2) collects the CSI for all the Shared APs in the coordination group.

In general, the challenges of channel sounding in multi-AP include: (1) STAs involved in the sounding cannot hear the coordinating AP (or the master) AP; (2) synchronization of APs in the multi-AP coordinating set; (3) overhead, complexity and performance of different sounding schemes; (4) variants of NDP transmission in explicit and implicit sounding; and (5) feedback collection and reduction.

The 802.11be Task Group (TG) has agreed to keep the structure of the NDP Announcement (NDPA) similar to the NDPA of 802.11ax as illustrated in FIG. 3. However, the STA Info field depicted in FIG. 4 is changed to accommodate the new features of 802.11be EHT.

As mentioned above, FIG. 3 illustrates an example High Efficiency (HE) NDPA frame format. One skilled in the art would recognize and understand this 802.11ax NDPA frame format and purpose/interpretation of the subfields included in the frame. The HE NDPA frame 300 may include a Frame Control field 302, Duration field 304, Receiver Address (RA) field 306, Transmitter Address (TA) field 308, Sounding Dialog Token field 310, one or more STA Info fields 312 (i.e., STA Info 1 . . . STA Info n), and Frame Check Sequence (FCS) field 314. The Frame Control field 302 may be 2 octets. The Duration field 304 may be 2 octets. The RA field 306 may be 6 octets. The TA field 308 may be 6 octets. The Sounding Dialog Token field 310 field may be 1 octet. The one or more STA Info fields 312 may be 4 octets each. The FCS field 314 may be 4 octets. The Frame Control field 302, Duration field 304, RA field 306, and TA field 308 may constitute a MAC header 320. The purpose and function of the fields illustrated in FIG. 3 are defined in the 802.11ax standard and are known and understood to those of ordinary skill in the art.

Figure 4:
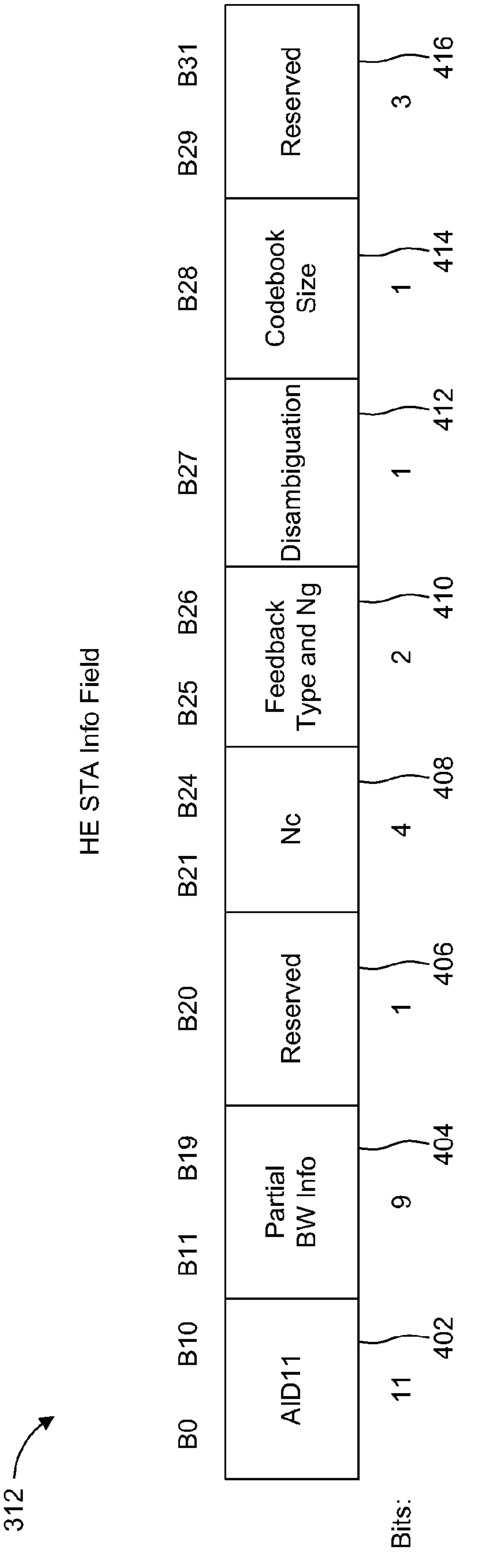
FIG. 4 illustrates an example of a STA Info field format in an EHT NDP Announcement frame.

FIG. 4 is a diagram illustrating an example format of the STA Info field 312 in the NDPA frame 300 shown in FIG. 3. One skilled in the art would recognize and understand this 802.11ax STA Info field format. The STA Info field 312 may include an Associated ID (AID) subfield 402, Partial BW Info subfield 404, Reserved subfield 406, Nc subfield 408, Feedback Type and Ng subfield 410, Disambiguation subfield 412, Codebook Size subfield 414, and Reserved subfield 416. The AID11 subfield 402 may be 11 bits. The Partial BW Info subfield 404 may be 9 bits. The Reserved subfield 406 may be 1 bit. The Nc subfield 408 may be 4 bits. The Feedback Type and Ng subfield 410 may be 2 bits. The Disambiguation subfield 412 may be 1 bit. The Codebook Size subfield 414 may be 1 bit. The Reserved subfield 416 may be 3 bits. The purpose and function of the subfields illustrated in FIG. 4 are defined in the 802.11ax standard and are known and understood to those of ordinary skill in the art.

Figure 5:
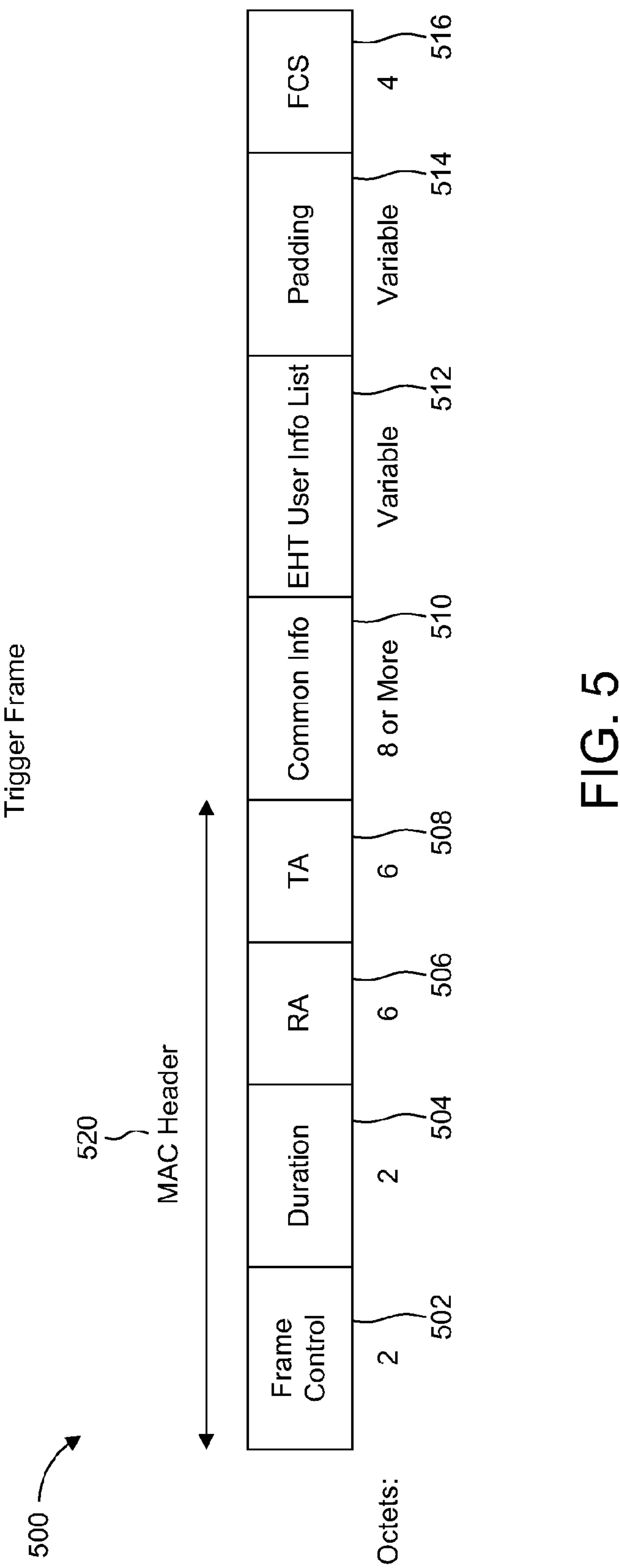
FIG. 5 illustrates an example of a Trigger frame format.

The Trigger frame was first introduced in 802.11ax to allocate resources and trigger single or multi-user access in the uplink. FIG. 5 illustrates an example of a trigger frame format. In 802.11be, a new variant of the User Info field is proposed, and a Special User Info field is added just after the Common Info field. Both enhancements, as illustrated in FIG. 6 and FIG. 7, allow a unified triggering scheme for both HE and EHT devices.

FIG. 5 illustrates an example of a trigger frame format. One skilled in the art would recognize and understand this 802.11ax Trigger frame format. The Trigger frame 500 may include a Frame Control field 502, Duration field 504, RA field 506, TA field 508, Common Info field 510, User Info List field 512, Padding field 514, and FCS field 516. The Frame Control field 502, Duration field 504, RA field 506, and TA field 508 may compromise a MAC header 520. The Frame Control field 502 may be 2 octets. The Duration field 504 may be 2 octets. The RA field 506 may be 6 octets. The TA field 508 may be 6 octets. The Common Info field 510 may be 8 or more octets. The User Info List field 512 and Padding field 514 may be variable octets. The FCF field 516 may be 4 octets. The purpose and function of the fields shown in FIG. 5 are defined in the 802.11ax standard and are known and understood to those of ordinary skill in the art.

Figure 6:
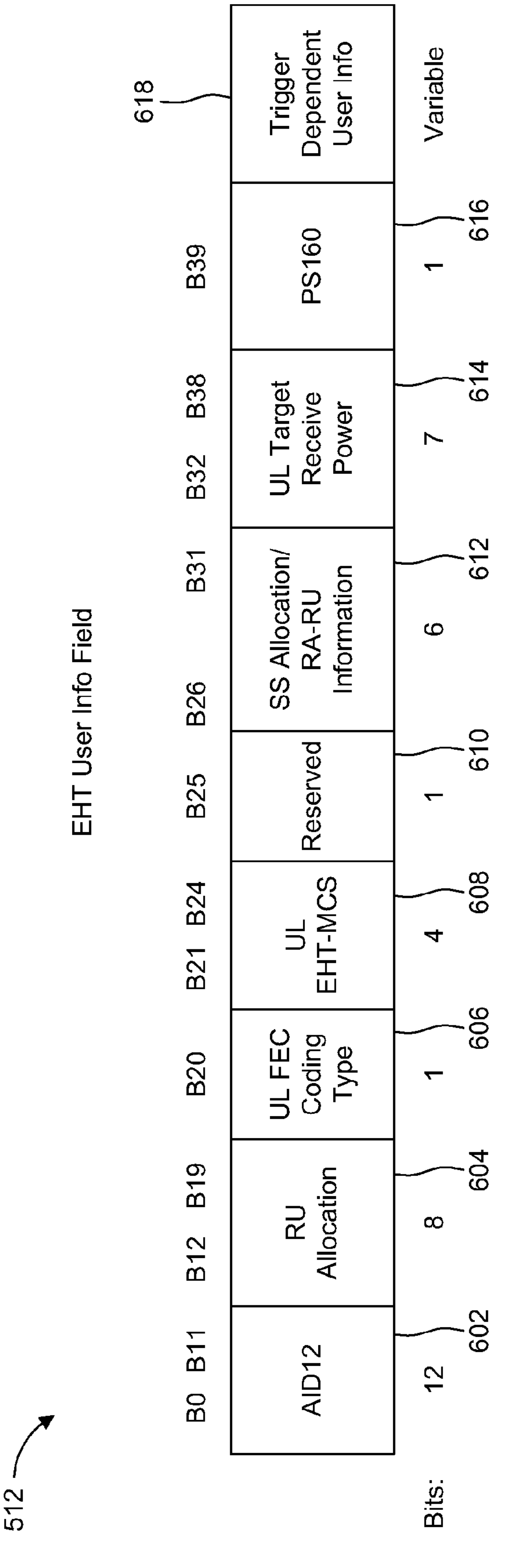
FIG. 6 illustrates an example of an Extremely High Throughput (EHT) Variant User Info field format.
Figure 7:
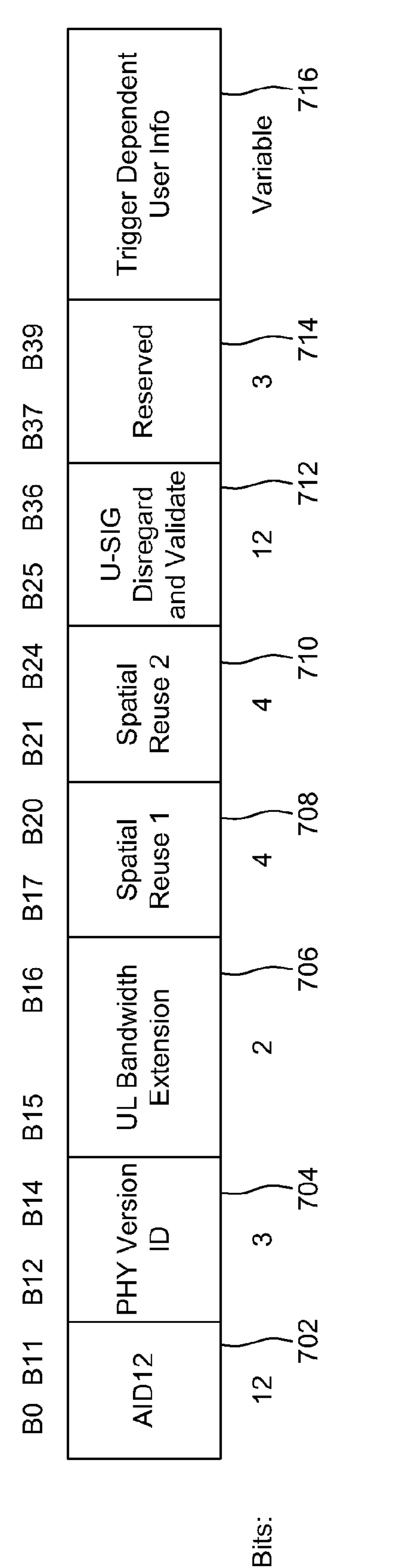
FIG. 7 illustrates an example of an EHT Special User Info field format.

FIG. 6 illustrates an example format of the User Info field 512 described in FIG. 5. One skilled in the art would recognize and understand this 802.11ax User Info field format. The EHT User Info field 512 may include an AID subfield 602, RU Allocation subfield 604, UL FES Coding Type subfield 606, UL EHT-MCS subfield 608, Reserved subfield 610, SS Allocation/RA-RU Information subfield 612, UL Target Receive Power subfield 614, PS 160 subfield 616, and Trigger Dependent User Info subfield 618. The AID12 subfield 602 may be 12 bits. The RU Allocation subfield 604 may be 8 bits. The UL FES Coding Type subfield 606 may be 1 bit. The UL EHT-MCS subfield 608 may be 4 bits. The Reserved subfield 610 may be 1 bit. The SS Allocation/RA-RU Information subfield 612 may be 6 bits. The UL Target Receive Power subfield 614 may be 7 bits. The PS160 subfield 616 may be 1 bit. The Trigger Dependent User Info subfield 618 may be variable bits. The purpose and function of the subfields illustrated in FIG. 6 are defined in the 802.11ax standard and are known and understood to those of ordinary skill in the art.

The content of the Trigger Dependent User Info subfield 618 is based on which type of trigger frame carries the EHT User Info field. For example, a beamforming feedback report poll (BFRP) trigger frame may have a Trigger Dependent User Info field that carries certain information, while a general trigger frame may have a Trigger Dependent User Info field that carries other, different information.

FIG. 7 illustrates an example of an EHT Special User Info field format. The EHT Special User Info field 700 may include an AID subfield 702, PHY Version ID subfield 704, UL Bandwidth Extension subfield 706, Spatial Reuse 1 subfield 708, Spatial Reuse 1 subfield 710, U-SIG Disregard and Validate subfield 712, Reserved subfield 714, and Trigger Dependent User Info subfield 716. The AID 12 subfield 702 may be 12 bits. The PHY Version ID subfield 704 may be 3 bits. The UL Bandwidth Extension subfield 706 may be 2 bits. The Spatial Reuse 1 subfield 708 may be 4 bits. The Spatial Reuse 2 subfield 710 may be 4 bits. The U-SIG Disregard and Validate subfield 712 may be 12 bits. The Reserved subfield 714 subfield may be 3 bits. The Trigger Dependent User Info subfield 716 may be variable bits. The content of the Trigger Dependent User Info is based on which type of trigger frame carries the EHT User Info field. For example, a beamforming feedback report poll (BFRP) trigger frame may have a Trigger Dependent User Info field that carries certain information, while a general trigger frame may have a Trigger Dependent User Info field that carries other, different information.

In 802.11be systems, a first problem exists in enhancing the Trigger frame design described above in FIG. 5. The EHT sounding protocol may show some differences from the HE sounding protocol. The EHT sounding protocol may require improvements on the Trigger frame 500 (e.g., BFRP Trigger frame) described in FIG. 5 to accommodate the change of EHT sounding protocol.

An enhanced sounding scheme may reduce the CSI feedback size significantly allowing for improved performance. However, such a scheme may require more complex computations which may need longer time to perform. To accommodate the enhanced channel sounding scheme, the trigger frame may need some enhancements. Several procedures and features may be defined to allow for the enhanced sounding scheme.

A second problem is that the overall duration of the current sounding protocol is dominated by the feedback report time. This is mainly due to the large number of bits required by the compressed beamforming reports. Accordingly, it is desirable to have a new sounding protocol to shorten the overall sounding protocol time with minimum channel accuracy loss.

A third problem is that the overall duration of the sounding protocol is proportional to the number of APs. In a MAP environment, the STAs need to report the channel state to both its associate AP and the OBSS AP. This may cause the MAP sounding protocol to take longer and become more complicated. Therefore, it is desirable to have a new sounding protocol in MAP which shortens the overall duration of sounding procedures and makes the channel state reports more efficient.

The above described problems are addressed by the embodiments described below.

In one method, one bit in the Reserved subfield 714 in FIG. 7 bits of Special User Info field 700 of BFRP trigger frame may be used to indicate if the requested sounding feedback is the EHT compressed/CQI report or non-EHT (including HE or legacy) compressed beamforming/CQI report. For example, bit=1 represents requesting EHT compressed beamforming/CQI report; bit=0 represents requesting non-EHT beamforming/CQI report.

If a non-EHT compressed beamforming/CQI report is requested, the non-AP STA may decode the bits in the Trigger Dependent User Information subfield 618 in FIG. 6, i.e., feedback segment retransmission bitmap to determine what feedback segments are requested; if EHT compressed beamforming/CQI report is requested, then the non-AP non-EHT STA may ignore it. In the latter case where a EHT compressed beamforming/CQI report is requested, the Trigger Dependent User Info subfield 618 may be used for other purposes. For example, the Trigger Dependent User Info subfield 618 may be used for indicating the NDP form and feedback format or which beamformed NDP (or precoded EHT-LTF set, which may contain Ns EHT-LTFs, where Ns is a function of transmitted antennas in the beamformer) is transmitted. The exemplary definition of the Trigger Dependent User Information subfield 618 in the BFRP trigger frame (as described in FIG. 5 above) used for indication of feedback format is given in Table 1 below:

TABLE 1

Exemplary Definitions of Trigger Dependent User Info subfield format in the BFRP Trigger Frame—Indication of Feedback Format

| Bits | Representation |
|---|---|
| 00000000 | Legacy EHT compressed beamforming/CQI |
| 00000001 | V matrix Index (VI) feedback/CQI (where only one or two indices of V matrices are fed back, V matrix sets are known by beamformer and beamformee) |
| 00000010 | Feedback for Individual Beamformed NDP (where each NDP is precoded by one precoder) |
| 00000011 | Feedback for Multi-Beamformed NDP (where a single NDP is transmitted but its EHT-LTFs are precoded by multiple precoders) |
| 00000100 | Feedback for Multi-Beamformed NDP variant (e.g., two NDPs are transmitted, the EHT-LTFs in each NDP are precoded by multiple precoders) |
| 00000101 | Reserved |

In one method, when the beamformed NDP (either individual beamformed NDP or multi-beamformed NDP or multi-beamformed NDP variant) is transmitted, the Trigger Dependent User Information subfield 618 may be used to indicate which beamformed NDPs (or precoded EHT-LTF set) are being transmitted. If the bit in position n (n=0 for LSB and n=7 for MSB) is 1, then the nth beamformed NDP (or the nth EHT-LTF set) is being transmitted. For example, the bit in position 1 is 1, then only the 1st precoded NDP is transmitted in individual beamformed NDP scheme or the first precoded EHT-LTF set (which contains Ns EHT_LTFs, where Ns is a function of number of transmitted antennas in the beamformer) is transmitted in Multi-Beamformed NDP or the first EHT-LTF set in the first beamformed NDP is transmitted in multi-beamformed NDP variant. If the bits in all positions are equal to 1, then all beamformed NDPs are transmitted in individual beamformed NDP; or all precoded EHT-LTF sets are transmitted in multi-beamformed NDP or its variant. Note that the bit in position n may refer to one beamformed NDP or one precoded EHT-LTF set. The bit may also refer to one groups of beamformed NDPs or one groups of precoded EHT-LTF sets. The exemplary definition of Trigger Dependent User Information subfield 618 format in the BFRP trigger frame (as described in FIG. 5 above) used for beamformed NDP (or EHT-LTF set) retransmission bitmap is given in Table 2 below.

TABLE 2

Exemplary definition of Triger Dependent User Info Subfield Format in the BFRP Trigger Frame—Beamformed NDP (or EHT-LTF set) Retransmission Bitmap

| Bits | Representation |
|---|---|
| 0000001 | The 1st beamformed NDP transmitted in Individual Beamformed NDP scheme or the 1st precoded EHT-LTF set transmitted in Multi-Beamformed NDP scheme or its variant. |
| 0000010 | The 2nd beamformed NDP transmitted in Individual Beamformed NDP scheme or the 2nd precoded EHT-LTF set transmitted in Multi-Beamformed NDP scheme or its variant. |
| 0000011 | The 1st and 2nd beamformed NDPs transmitted in Individual Beamformed NDP scheme or the 1st and 2nd EHT-LTF sets transmitted in Multi-Beamformed NDP scheme or its variant. |
| 0000100 | The 3rd beamformed NDP transmitted in Individual Beamformed NDP scheme or the 3rd precoded EHT-LTF set transmitted in Multi-Beamformed NDP scheme or its variant. |
| 0000101 | The 1st and 3rd beamformed NDPs transmitted in Individual Beamformed NDP scheme or the 1st and 2rd precoded EHT-LTF sets transmitted in Multi-Beamformed NDP scheme or its variant. |
| . . . | . . . |
| 1111111 | All beamformed NDPs transmitted in Individual Beamformed NDP scheme or all precoded EHT-LTF sets transmitted in Multi-Beamformed NDP scheme or its variant. |

In one embodiment, to prevent the high data rate transmission of TB PPDU in the TB sounding sequence, the value given in the UL EHT-MCS subfield 608 of the User Info field 512 in FIG. 6, which indicates the solicited EHT TB PPDU, may not result in a data rate of TB PPDU larger or equal to a certain value (e.g., 1.5 Gbps). Alternatively, to give the recipient STA more time to process the CSI feedback, more padding bits may be added to the BFRP trigger frame. The corresponding solution is to use the reserved value in Trigger Frame 500 MAC Padding Duration subfield of the HE MAC Capabilities Information field, i.e., set to 3 to indicate any value larger than 16 μs. This indication may also be specified for BFRP Trigger frame only.

Alternatively, one reserved bit in a EHT MAC capabilities Information field may be used to indicate the TB Sounding Feedback Rate Limit. For example, the reserved bit may be set to 0 to indicate the maximum supported data rate of EHT compressed beamforming/CQI Report in the EHT TB sounding sequence is same as the maximum supported rate in TB PPDU data transmission computed from the Supported EHT MCS And NSS Set field of EHT Capabilities element. The reserved bit may also be set to 1 to indicate the maximum supported data rate of EHT compressed beamforming/CQI Report in the EHT TB sounding sequence is the min of a fixed data rate (e.g., the fixed data rate is 1.5 Gbps) and the maximum supported rate in TB PPDU data transmission computed from the Supported EHT MCS And NSS Set field of EHT Capabilities element.

Alternatively, one reserved bit in a EHT PHY Capabilities Element (e.g., B63 or B0) may be used to indicate maximum supported data rate of EHT compressed beamforming/CQI Report in the EHT TB sounding sequence. For example, the reserved bit may be set to 0 to indicate the maximum supported data rate of EHT compressed beamforming/CQI Report in the EHT TB sounding sequence is same as the maximum supported rate in TB PPDU data transmission computed from the Supported EHT MCS And NSS Set field of EHT Capabilities element. The reserved bit may also be set to 1 to indicate the maximum supported data rate of EHT compressed beamforming/CQI Report in the EHT TB sounding sequence is min of a fixed data rate (e.g., the fixed data rate is 1.5 Gbps) and the maximum supported rate in TB PPDU data transmission computed from the Supported EHT MCS And NSS Set field of EHT Capabilities element.

Enabling enhanced sounding scheme may require modifications to the Trigger frame 500. The processing required to identify the best (or the worst for beam nulling) vector index or beam index may take longer time than the processing required in legacy CSI feedback. Accordingly, allowing more time for processing (especially for low end devices) is desirable.

In one embodiment, the AP may use the Padding subfield 514 in the trigger frame 500 as depicted in FIG. 5 to allow for more processing time. The AP may increase the padding length to allow enough time for the worst case considering the weakest device which may be identified in the capability exchange performed early in the association.

In one embodiment, the AP may add some dummy user information subfields in the User Info List field 512 described. Those dummy subfields may be addressed with a reserved AID or any other AID as appropriate. This may extend the available time before the STAs are required to send the index-based CSI feedback.

In one embodiment, the AP may group the STAs based on their capabilities such that the powerful devices may be triggered to send their CSI feedback in the first round of trigger/CSI feedback and the computationally limited devices may be triggered to send their feedback later. The grouping of the STAs may take place based on the capabilities exchange performed in the association, and it may be in two or more groups categorized by their processing capabilities.

In one embodiment, the AP may use one or more bits in the common info field 510 in the Trigger frame 500 described in FIG. 5 to signal that the expected inter-frame space is longer than SIFS. In one example, the extended inter-frame space (EIFS) may be used instead of SIFS. In another example, the AP may signal that the inter-frame space is N multiples of SIFS and to enable this option the AP may use one or more bits in the common info field to signal the parameter N.

In some cases, it may be desirable to enable mixed feedback in the same channel sounding session. This may allow for receiving the CSI feedback from legacy STAs and STAs supporting the enhanced channel sounding scheme in the same channel sounding round. In one embodiment, the AP may group the STAs such that the legacy STAs may be triggered in a trigger frame in a triggering/CSI feedback round and the advanced STAs may be triggered in a separate trigger frame in the next round. This may allow more time to process the CSI feedback by the STAs supporting the enhanced channel sounding scheme.

In multi-AP channel sounding, as described in FIG. 2, the CSI feedback for the channels between the coordinating/coordinated APs and the STAs involved in the sounding session may be collected in different ways. In one scheme (scheme 1) each AP may collect the CSI feedback form its associated STAs and from OBSS STAs. In another scheme (scheme 2), each AP may collect the CSI feedback from its associated STAs only. In yet another scheme (scheme 3), the coordinating AP collects the feedback for all APs from all STAs.

In the three enhanced channel sounding schemes described above, the CSI feedback may be index-based feedback, where the index may refer to a certain precoding matrix/vector that correlates the most with the true channel matrix V. Accordingly, the feedback may be very few bits for each subcarrier (as compared to tens to hundreds of octets in the legacy compressed beamforming feedback).

In one embodiment (considering scheme 2 above), an AP may trigger its associated STAs to send a combined index-based beamforming report which contains the CSI feedback between a STA and all or some of the APs involved in the sounding session. In one example, one bit in the STA Info field 312 with AID12 corresponding to a given STA in the Trigger frame 500 may be repurposed to indicate whether the STA is expected to send an individual CSI feedback (the feedback of the channel to its associated AP only) or a combined CSI feedback. Additionally, or alternatively, the Trigger Dependent User Info subfield 618 of the User Info field 512 may be used to indicate that the expected feedback is individual or combined feedback. The AP receiving the combined CSI feedback which contains the CSI feedback of other APs may then send their CSI feedback over the air or using a wired backhaul.

The embodiments below address how to design an efficient sounding protocol, as described in FIG. 2, to reduce the overall duration, which include the MAP-NDPA frame 206, NDP frame 210*a*, 210*b*, and 210*c*, Trigger frame 214, and Feedback Report 216*a*, 216*b*, and 216*c*.

Sounding protocols with enabled V index (VI) feedback (where only the index of predefined V matrices is fed back and the predefined V matrices are known by the beamformer and the beamformee) are described below. In VI feedback protocol, the STA may take longer processing time to determine the V matrix index which matches the real channel the best (or the worst) for beam nulling. Therefore, the sounding protocol may require an enhanced design to compensate for the longer processing time to feedback the VI. There are multiple solutions which may be used in different scenarios.

Figure 8:
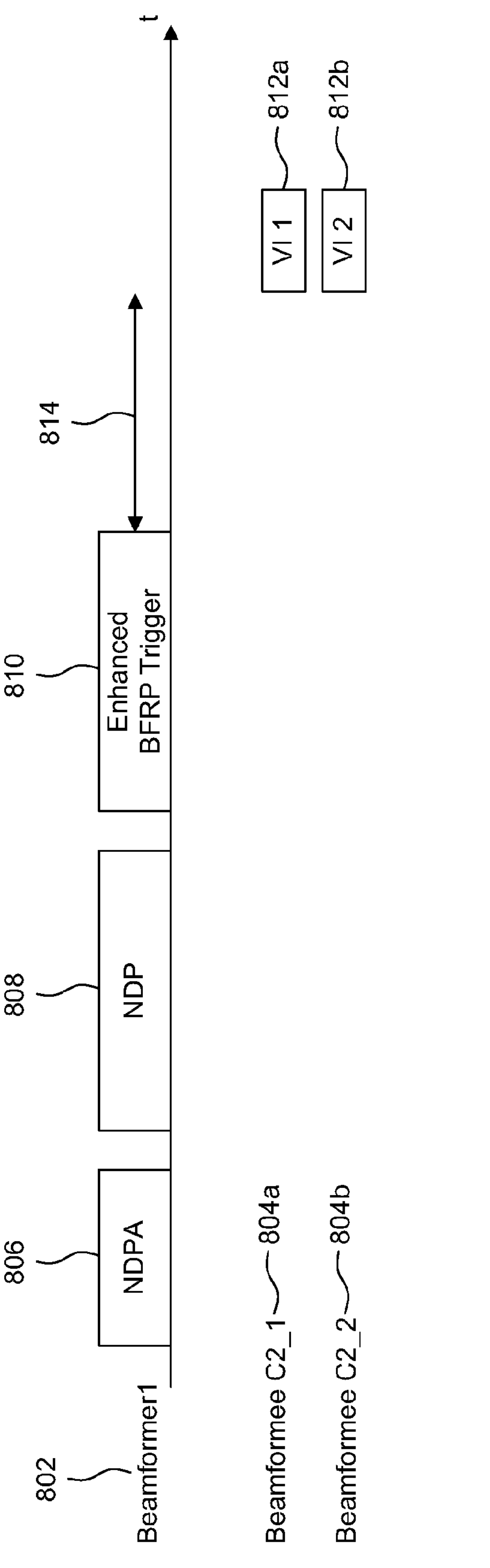
FIG. 8 illustrates an example of VI sounding protocol with C2 STAs only.

In one scenario, as shown in FIG. 8, there may be two class 2 STAs. As shown in FIG. 8, the beamformer 802 transmits an NDPA 806, NDP 808, and Enhanced BFRP Trigger 810. The Enhanced BFRP Trigger frame 810 may have the Trigger frame format 500 described in FIG. 5 above.

In response to the Enhanced BFRP Trigger 810, the beamformee 804*a* and beamformee 804*b* transmit a feedback report 812*a* and 812*b* respectively. In the scenario illustrated in FIG. 8 (i.e., only 2 class 2 STAs), one method may be to define a longer waiting time 814 between the Enhanced BFRP trigger frame 810 and the feedback reports 812*a* and 812*b*. This long waiting time 814 may be nSIFS (e.g., n=3) and may be indicated in the Enhanced BFRP trigger 810. In FIG. 8, the beamformer 802 may be an AP and the beamformees 804*a* and 804*b* may be STAs.

There are at least two options of including this indication (i.e., waiting time 814) in the Enhanced BFRP Trigger 810. In one option, the indication may use the reserved bit in the Common Info field (such as the Common Info field 510 in Trigger frame 500 in FIG. 5) to indicate if the waiting time is regular (i.e., SIFS, or longer than regular (e.g., nSIFS, n>1). In another option, the indication may use the feedback segment retransmission bitmap shown in the Trigger Dependent User Info subfield 618. Since the feedback bits are greatly reduced in VI feedback scheme, there are much fewer segments in the report. One bit in the feedback segment retransmission bitmap may be used as the bit to indicate if the waiting time is longer or not.

As illustrated in FIG. 8, the beamformer 802 may be an AP and the beamformees 804*a* and 804*b* may be STAs.

Alternatively, another method may be to group C2 STAs based on their capabilities (e.g., signal processing capabilities or the capabilities to access the different subsets of the predefined precoder se. The same group of C2 STAs may be scheduled at the same time to feedback CSI.

Figure 9:
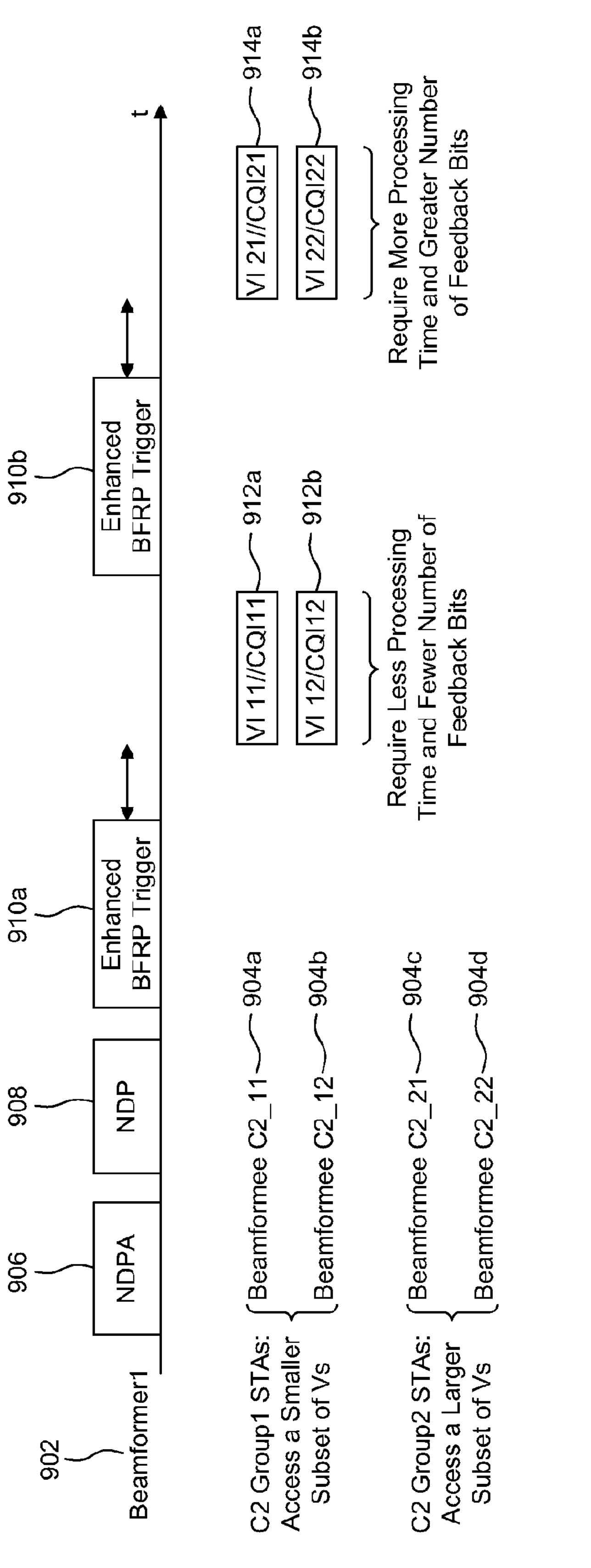
FIG. 9 illustrates an example of a sounding protocol of group based VI feedback.

FIG. 9 illustrates an exemplary sounding protocol of group based VI feedback. For example, beamformee 904*a* and beamformee 904*b* may be EHT R2 STAs (i.e., group 1) and beamformee 904*c* and beamformee 904*d* may be beyond STAs (i.e., group 2).

The beamformer 902 transmits an NDPA 906, NDP 908, and Enhanced BFRP Trigger 910*a*. Upon reception of the Enhanced BFRP Trigger 910*a*, beamformee 904*a* and beamformee 904*b*, which have high processing capability or are only able to access the smaller subset of precoders, transmit feedback reports 912*a* and 912*b*. The Enhanced BFRP Triggers 910*a* and 910*b* may have the Trigger frame format 500 described in FIG. 5 above. The beamformer 902 may be an AP and the beamformees 904*a*, 904*b*, 904*c*, and 904*d* may be STAs.

Beamformer 902 then transmits Enhanced BFRP Trigger 910*b*. Upon reception of the Enhanced BFRP Trigger 910*b*, beamformee 904*c* and beamformee 904*d*, which have lower processing capability or access the larger subset of precoders, are scheduled to send feedback 914*a* and 914*b* after feedback 914*a* and 914*b*. The trigger frame may be sent out before the transmission of each group of VI feedback. The waiting time between each BFRP Trigger frame and VI feedback is the regular waiting time (i.e., SIFS).

Figure 10:
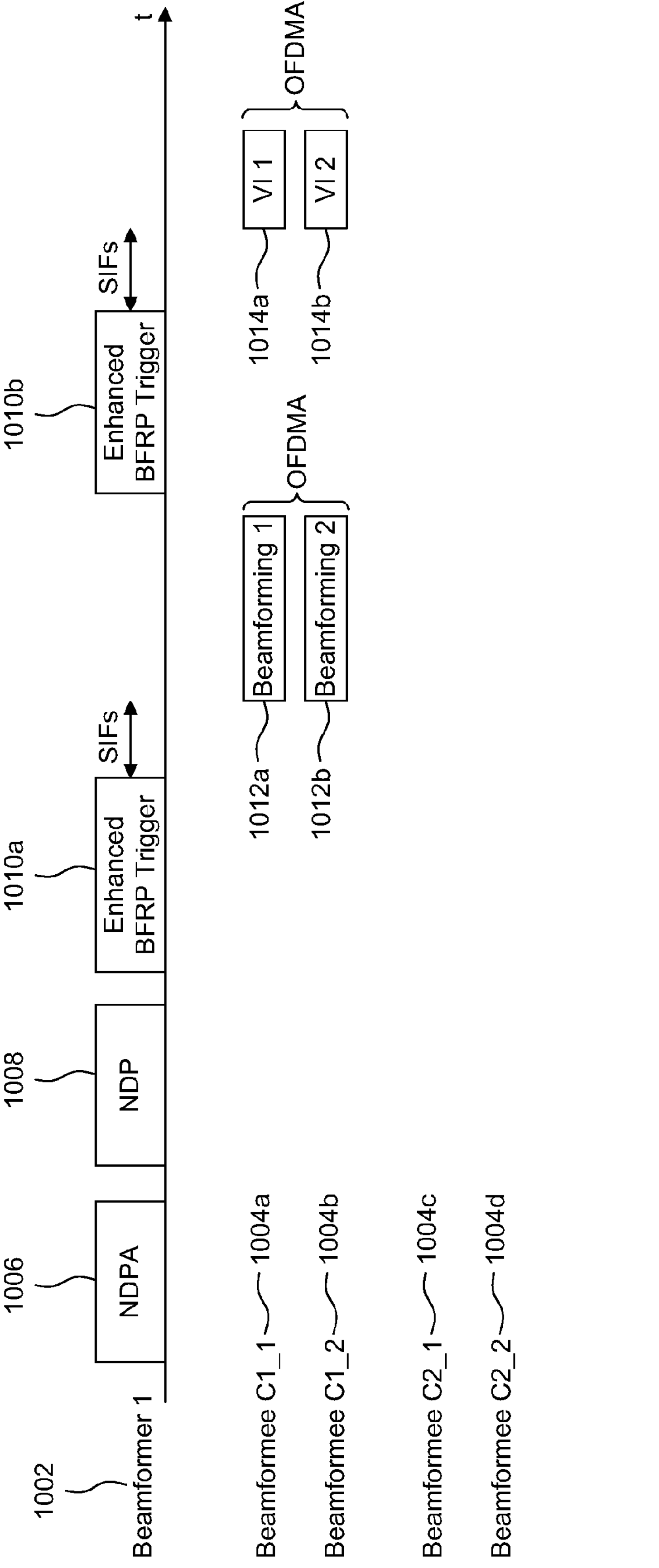
FIG. 10 illustrates an example of a VI sounding protocol with mixed classes of STAs (C1 STAs and C2 STAs)

In another scenario, there may mixed classed STAs that are requested to report their respective channel state information: (1) Class 1 STAs (EHT R1 and before STAs) and (2) Class 2 STAs (EHT R2 and beyond STAs). FIG. 10 illustrates an exemplary VI sounding protocol with mixed class STAs (i.e., C1 STAs and C2 STAs).

EHT E R1 STAs are the EHT STAs that have not implemented any EHT features which cannot be indicated in the EHT Capabilities element. EHT before STAs are legacy STAs that have not implemented any EHT features. EHT R2 and beyond STAs are STAs that have implemented advanced features that do not exist in legacy and EHT R1 STAs.

FIG. 10 illustrates an example of a VI sounding protocol with mixed classes of STAs (e.g., C1 STAs and C2 STAs). Similar to FIGS. 8 and 9, the beamformer 1002 transmits a NDPA 1006, NDP 1008, Enhanced BRFP Trigger 1010*a* and Enhanced BFRP Trigger 1010*b*. The Enhanced BFRP Triggers 1010*a* and 1010*b* may have the Trigger frame format 500 described in FIG. 5 above.

As shown in FIG. 10, one method may be to first request, via the Enhanced BFRP Trigger 1010*a*, the beamforming reports 1012*a* and 1012*b* from beamformee 1004*a* and beamformee 1004*b* (i.e., C1 STAs). After the legacy compressed beamforming reports 1012*a* and 1012*b* are reported, VI feedback reports 1014*a* and 1014*b* are requested by another Enhanced Trigger frame 1010*b*. The legacy non-AP (C1) STAs may use OFDMA method to send back the compressed beamforming reports with assigned potentially larger BW. The C2 STAs may also use OFDMA to send VI feedbacks. The waiting periods between the Trigger frame and beamforming report or VI report are the same. (i.e., SIFS as shown in FIG. 10). The beamformer 1002 may be an AP and the beamformees 1004*a*, 1004*b*, 1004*c*, and 1004*d* may be STAs.

Multiple implementations to address the sounding procedure for beamformed NDP (where NDP are precoded by multiple precoders and the STA are requested to send the index of the precoder. For example, the precoder with the best match (or the worst match for beam nulling) of the channel or the precoder with the least match of the channel) are described below. Multiple implementations may be used for various scenarios.

In one scenario, there may only be class 2 STAs (i.e., EHT R2 and beyond STAs) which are requested to send the channel state information. The EHT symbols may applied with all N_B precoders transmit in one NDP frame.

Figure 11:
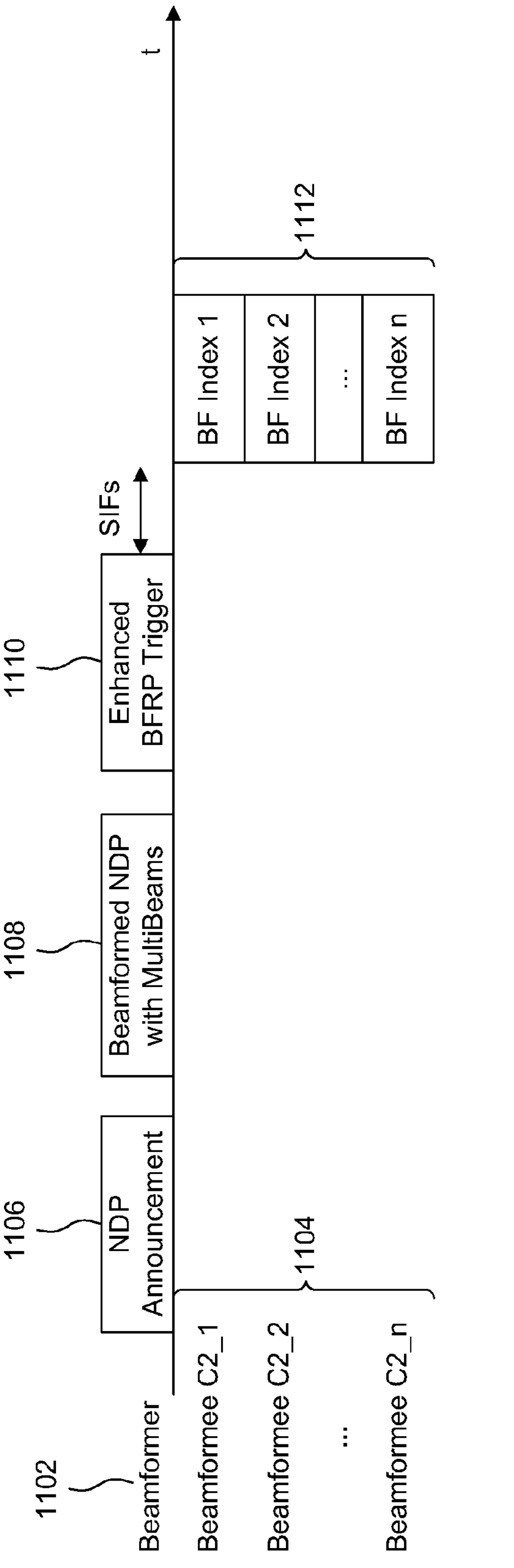
FIG. 11 illustrates an example of a beamformed NDP sounding protocol with only C2 STAs.

FIG. 11 illustrates an example of a beamformed NDP sounding protocol with class 2 (C2) STAs only. Beamformer 1102 transmits NDPA 1106, NDP 1108, and Enhanced BFRP Trigger 1110. The NDP 1108 may be a beamformed NDP with multibeams. The Enhanced BFRP Trigger 1110 may have the Trigger frame format 500 described in FIG. 5 above. Upon receiving the Enhanced BFRP Trigger 1110, the one or more C2 beamformees 1104 transmit feedback reports 1112. The beamformer 1102 may be an AP and the beamformees 1104 may be STAs.

Figure 12:
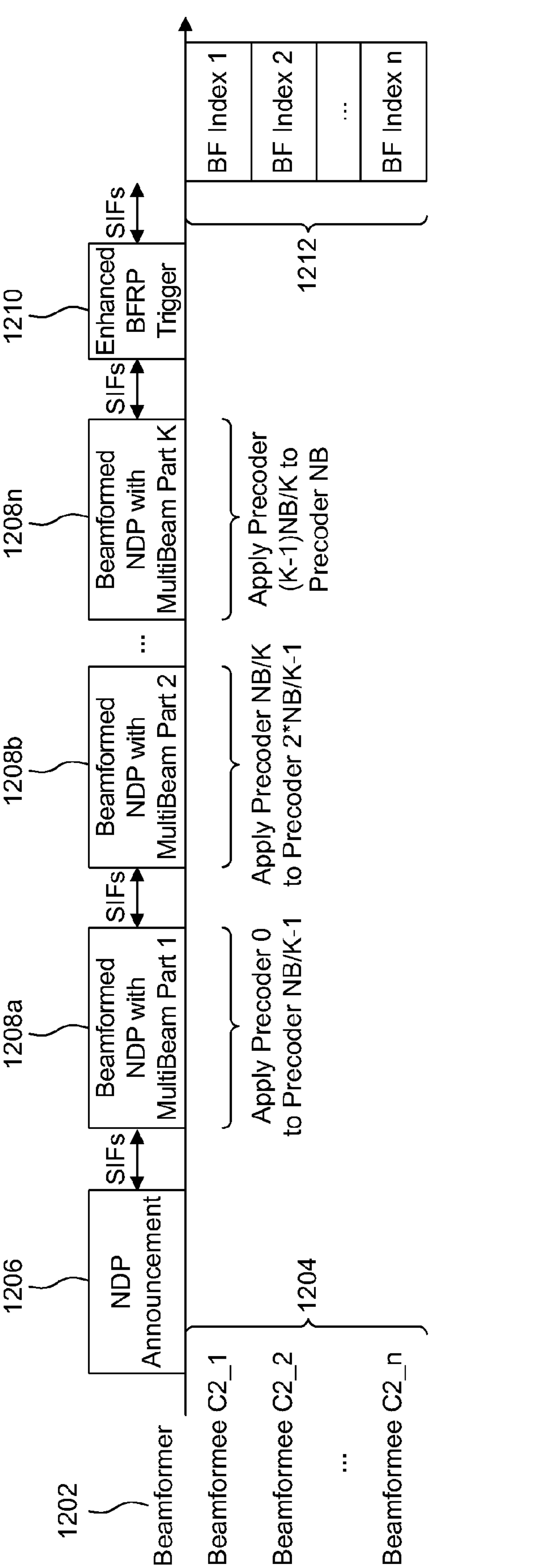
FIG. 12 illustrates another example of a beamformed NDP sounding protocol with only C2 STAs.

Alternatively, as shown in FIG. 12, a beamformer may transmit the EHT symbols with different precoders in K NDPs such that it does not need to require the non-AP STA to process many EHTs in a short amount of time. To shorten the overall duration, the exemplary value of K may be 2 or 3.

FIG. 12 illustrates an another example of a beamformed NDP sounding protocol with C2 STAs. As demonstrated in FIG. 12, similar to FIG. 11, a beamformer 1202 transmits an NDPA 1206. However, in contrast to FIG. 11, instead of transmitting one NDP frame, the beamformer 1202 transmits one or more Beamformed NDP 1204*a*, 1204*b*, and 1204*n*. The beamformer 1202 then transmits an Enhanced BFRP Trigger frame 1210. In response, the one or more beamformees 1204 transmit feedback reports 1212. The Enhanced BFRP Trigger frame 1210 may have the Trigger frame format 500 described in FIG. 5 above. The beamformer 1202 may be an AP and the beamformees 1204 may be STAs.

Figure 13:
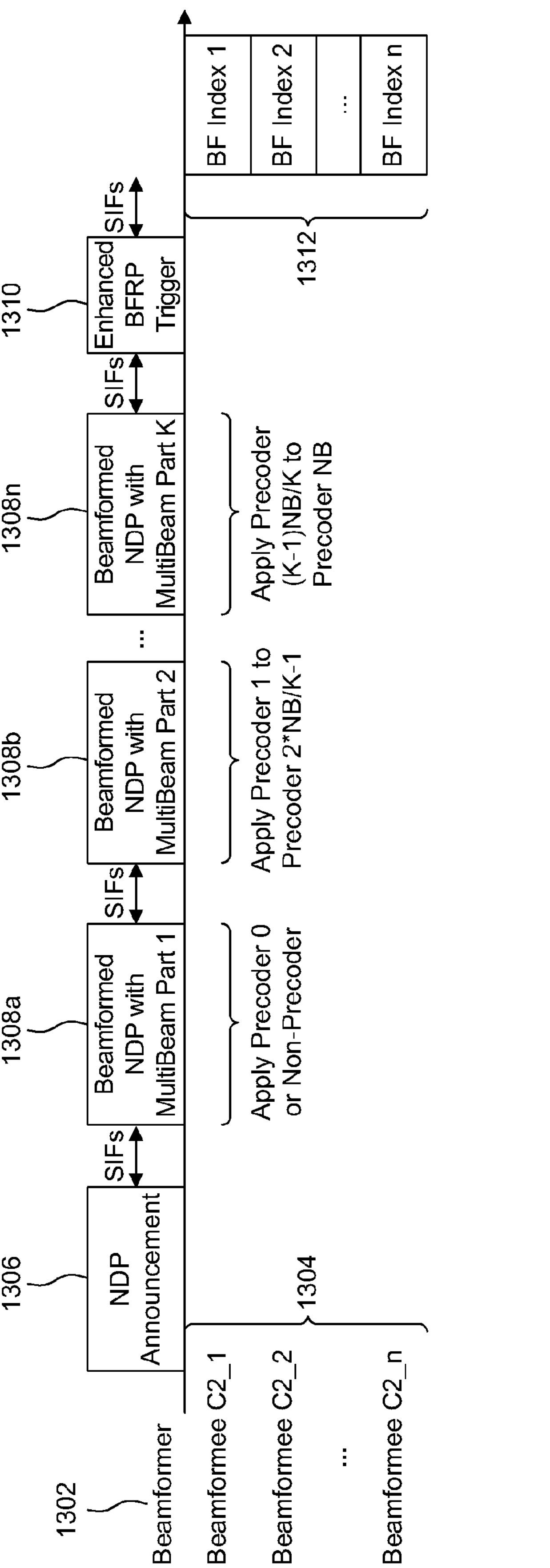
FIG. 13 illustrates an example of a beamformed NDP sounding protocol with C1 STAs and C2 STAs.

In another scenario, there are mixed C1 and C2 STAs which are requested to send the channel state information. As illustrated in FIG. 13, to enable the backward capability, the beamformer may choose to have the first NDP transmitted with one precoder or non-precoder and the remaining NDPs transmitted with precoded EHT symbols as indicated in FIG. 13.

Similar to FIG. 12, in FIG. 13 a beamformer 1302 transmits an NDPA 1306 and one or more Beamformed NDP 1304*a*, 1304*b*, and 1304*n*. The beamformer 1302 then transmits an Enhanced BFRP Trigger 1310. In response, the one or more beamformees 1304 transmit feedback reports 1312. The Enhanced BFRP Trigger 1310 may have the Trigger frame format 500 described in FIG. 5 above. The beamformer 1302 may be an AP and the beamformees 1304 may be STAs.

However, in contrast to FIG. 12, to enable the backward capability, the beamformer may choose to have the first NDP transmitted with one precoder or non-precoder and the remaining NDPs transmitted with precoded EHT symbols as indicated in FIG. 13.

In this case, the number of EHTs may vary from NDP to NDP. The information on the number of EHT-LTFs and the transmission form of EHT (precoded or non precoded) may be indicated in the NDPA STA info subfield 312 as shown in FIGS. 3 and 4. Alternatively, the SIFs between NDPs may be removed. The duration for each NDP should be defined in NDPA. NDPs→BFRP→BF may be repeated for beam fine tuning and beam tracking.

Implementations to optimize the sounding procedures in a MAP environment are described below. In one method, when multiple APs request the index-based feedback, the solicited STAs may combine its feedback reports and send back to one AP (e.g., its associated AP). The AP that receives the feedback of multiple APs may forward the CSI to the corresponding AP.

Figure 14:
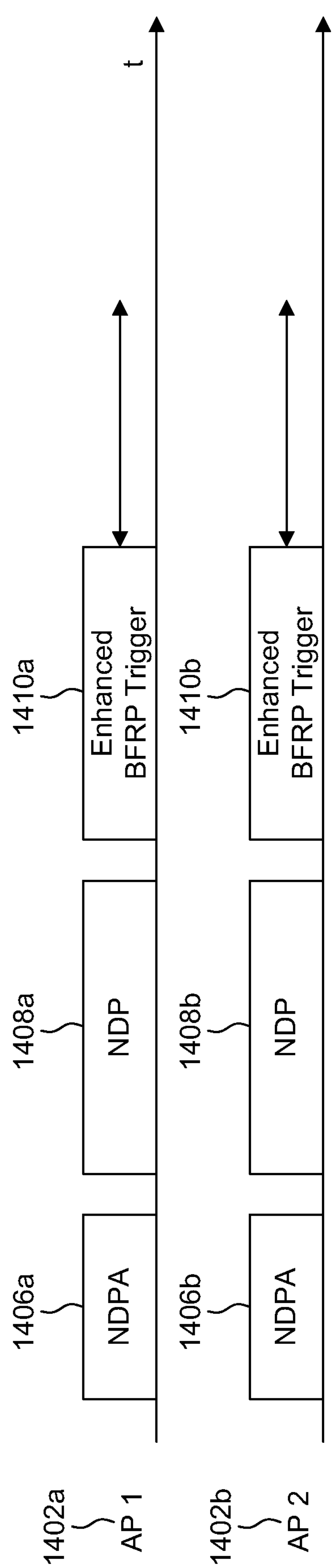
FIG. 14 illustrates an example of a multi-AP sounding protocol with index feedback.

FIG. 14 depicts the an example of a MAP sounding protocol with index feedback. In FIG. 14, AP1 1402*a* is associated with STA 1404*a* and 1404*b* and AP2 1402*b* is associated with STA 1404*c* and 1404*d*. AP1 1402*a* transmits an NDPA 1406*a*, NDPA 1408*a*, and Enhanced BFRP Trigger 1410*a*. AP2 1402*b* may transmit an NDPA 1406*b*, NDPA 1408*b*, and Enhanced BFRP Trigger 1410*b*. Upon reception of the Enhanced BFRP Trigger 1410*a*, STA 1404*a* may transmit index feedback report 1412*a* and STA 1404*b* may transmit index feedback report 1412*b*. Upon reception of the Enhanced BFRP Trigger 1410*b*, STA 1404*c* may transmit index feedback report 1412*c* and STA 1404*d* may transmit index feedback report 1412*d*. Index feedback reports 1412*a*, 1412*b*, 1412*c*, and 1412*d* may be transmitted at the same time. The index feedback reports 1412*a*, 1412*b*, 1412*c*, and 1412*d* may be VI feedback or beam index feedback or other short feedback reports.

The Enhanced BFRP Triggers 1410*a* and 1410*b* may have the Trigger frame format 500 described in FIG. 5 above.

An AP may trigger its associated STA to send a combined feedback report which contains VI feedback for several APs in the same CSI feedback frame. To enable this feature, several changes may be introduced to the EHT Compressed beamforming/CQI frame format.

In one embodiment, some entries may be added to the EHT Action field values table to indicate a new format of enhanced feedback. In one example, an entry of value 1 (or any other value) may be added to indicate that the feedback management frame carries an enhanced index-based CSI feedback and another entry of value 2 (or any other value) may be added to indicate that the feedback management frame carries a combined enhanced index-based CSI feedback. Table 3 shows example EHT action field values.

TABLE 3

EHT Action Field Values

| Value | Meaning |
|---|---|
| 0 | EHT compressed beamforming/CQI |
| 1 | EHT Individual Enhanced Beamforming/CQI |
| 2 | EHT Combined Enhanced Beamforming/CQI |
| 3-255 | Reserved |

In one embodiment, one or more bits in the EHT MIMO control field may be used to indicate that the beamforming feedback frame is carrying either individual or combined enhanced beamforming report. In one example, one bit may be named as individual/combined such that it is set to 0 to signal that the carried beamforming report is individual report or set to 1 to indicate that the beamforming report is combined report.

In one embodiment, a subfield may be added to the MIMO control field (number of combined reports subfield) with a size of two or more bits and may be used to indicate how many beamforming reports are combined in the feedback frame (the N parameter indicated in Table 4).

TABLE 4

Example 1 of EHT Enhanced Beamforming/CQI Frame Action Field Format

| Order | Information |
|---|---|
| 1 | Category |
| 2 | EHT Action |
| 3 | EHT MIMO Control |
| 4 | EHT Enhanced Beamforming Report 1 |
| 5 | MU Exclusive Enhanced Beamforming Report 1 |
| 6 | EHT CQI Enhanced Report 1 |
| . . . | |
| 3N + 1 | EHT Enhanced Beamforming Report N |
| 3N + 2 | MU Exclusive Enhanced Beamforming Report N |
| 3N + 3 | EHT CQI Enhanced Report N |

In one example, 2 bits may be used with a minimum number of combined reports being 2 reports (N=2). Table 5 shows an exemplary encoding.

TABLE 5

Exemplary Encoding of the Number of Combined Reports Subfield in the MIMO Control Field

| Sequence | Number of Combined Reports (N) |
|---|---|
| 00 | 2 |
| 01 | 3 |
| 10 | 4 |
| 11 | 5 |

In one embodiment, the combined reports may be ordered in ascending order of the AP IDs such that the first enhanced beamforming report may be intended to the AP with the smallest ID and the last enhanced beamforming report may be intended for the AP with the largest ID. The triggering AP who sent the trigger frame to solicit the enhanced beamforming report may has a list of all the APs involved in this cannel sounding session and a mapping between which APs may expect channel sounding feedback from which STAs. This information may be exchanged in a multi-AP NDPA which may be sent as the first step in the multi-AP channel sounding procedure.

In one embodiment, a combined report map field may be added to the enhanced beamforming/CQI frame to indicate which beamforming report is intended to which AP as shown in Table 6. In one example, the combined report map may be designed such that it consists of N elements each represents the AP ID that maps to the corresponding report (e.g., the first AP ID is the AP mapped to the first enhanced beamforming report and so on).

TABLE 6

Example 2 of EHT Enhanced Beamforming/CQI Frame Action Field Format

| Order | Information |
|---|---|
| 1 | Category |
| 2 | EHT Action |
| 3 | EHT MIMO Control |
| 4 | Combined Report Map |
| 5 | EHT Enhanced Beamforming Report 1 |
| 6 | MU Exclusive Enhanced Beamforming Report 1 |
| 7 | EHT CQI Enhanced Report 1 |
| . . . | |

TABLE 6-continued

| Example 2 of EHT Enhanced Beamforming/ CQI Frame Action Field Format | |
|---|---|
| Order | Information |
| 3N + 2 | EHT Enhanced Beamforming Report N |
| 3N + 3 | MU Exclusive Enhanced Beamforming Report N |
| 3N + 4 | EHT CQI Enhanced Report N |

Figure 15:
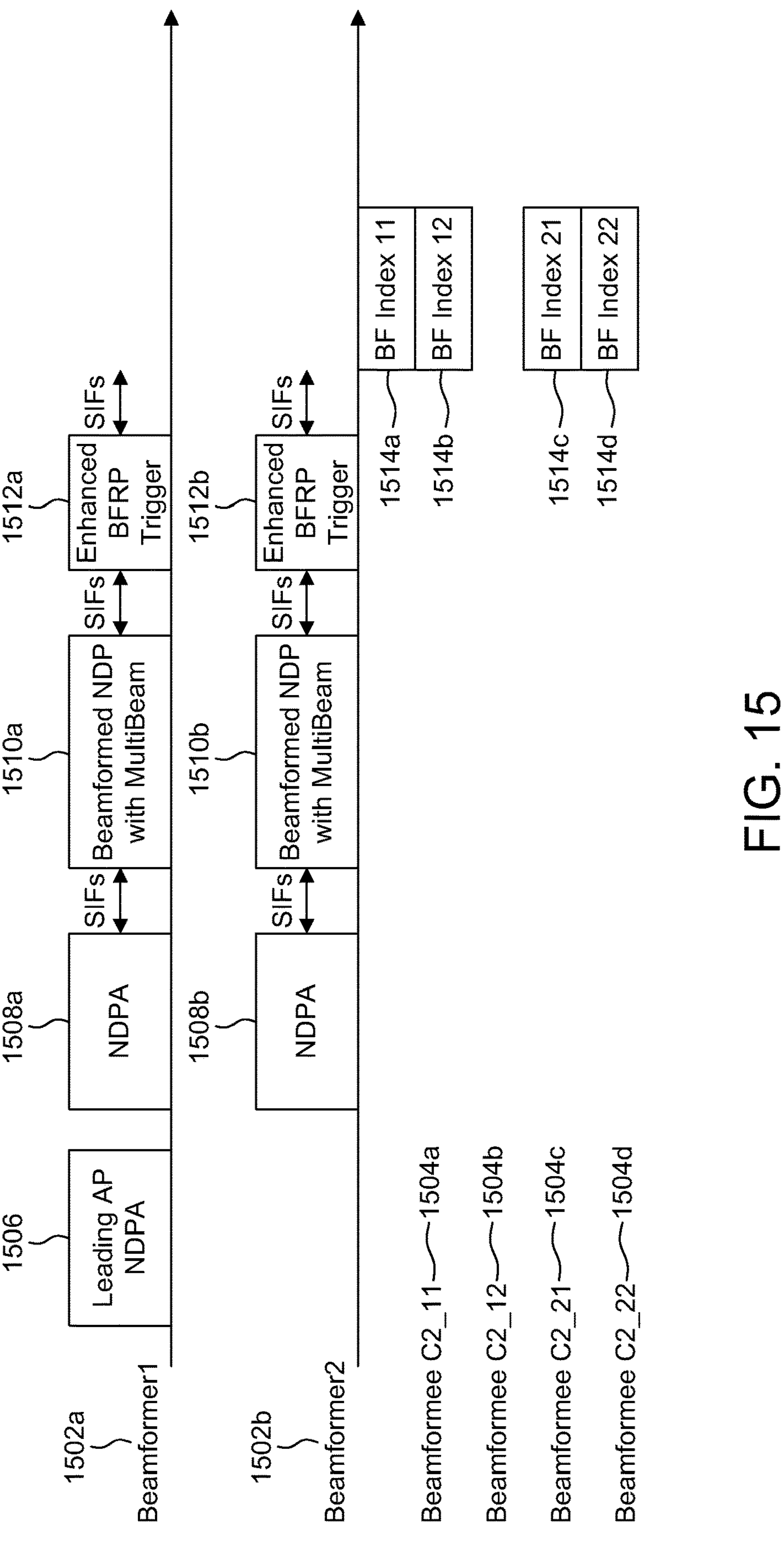
FIG. 15 illustrates an example of a single beamformed multi-AP sounding procedure.

FIG. 15 illustrates an example embodiment of a single beamformed MAP sounding procedure. Beamformer 1502*a* may transmit a Leading AP NDPA. Next, Beamformer 1502*a* and 1502*b* transmit respective NDPAs 1508*a* and 1508*b*, NDPs 1510*a* and 1510*b*, and Enhanced BFRP Triggers 1512*a* and 1512*b*. In response, Beamformee 1504*a* transmits BF Index 1514*a*, Beamformee 1504*b* transmits BF Index 1514*b*, Beamformee 1504*c* transmits BF Index 1514*c*, and Beamformee 1504*d* transmits BF Index 1514*d*. The Enhanced BFRP Triggers 1510*a* and 1510*b* may have the Trigger frame format 500 described in FIG. 5 above.

In FIG. 15, it is assumed that $N_{AP}=2$ and that the beamformee may either be C2 or C1. As shown in FIG. 15, the embodiment contains the number of EHT-LTFs as $$N_{EHT-LTF} = \sum_{i=1}^{N_{AP}} N_{B,i} N_{SS,BF-NDP,i},\ N_{SS,BF-NDP,i}$$

is the number of EHT-LTFs sent by AP_i using one fixed precoder.

Each AP may apply different number of precoders to EHT_LTF, i.e., $N_{B,i}$ may vary from AP to AP. Both $N_{SS,\ BF-NDP,\ i}$ and $N_{B,i}$ are indicated by NDPA STA Info field sent from $AP_i$. Some AP may send un-precoded EHT-LTF, i.e., $N_{B,i}=1$.

Figure 16:
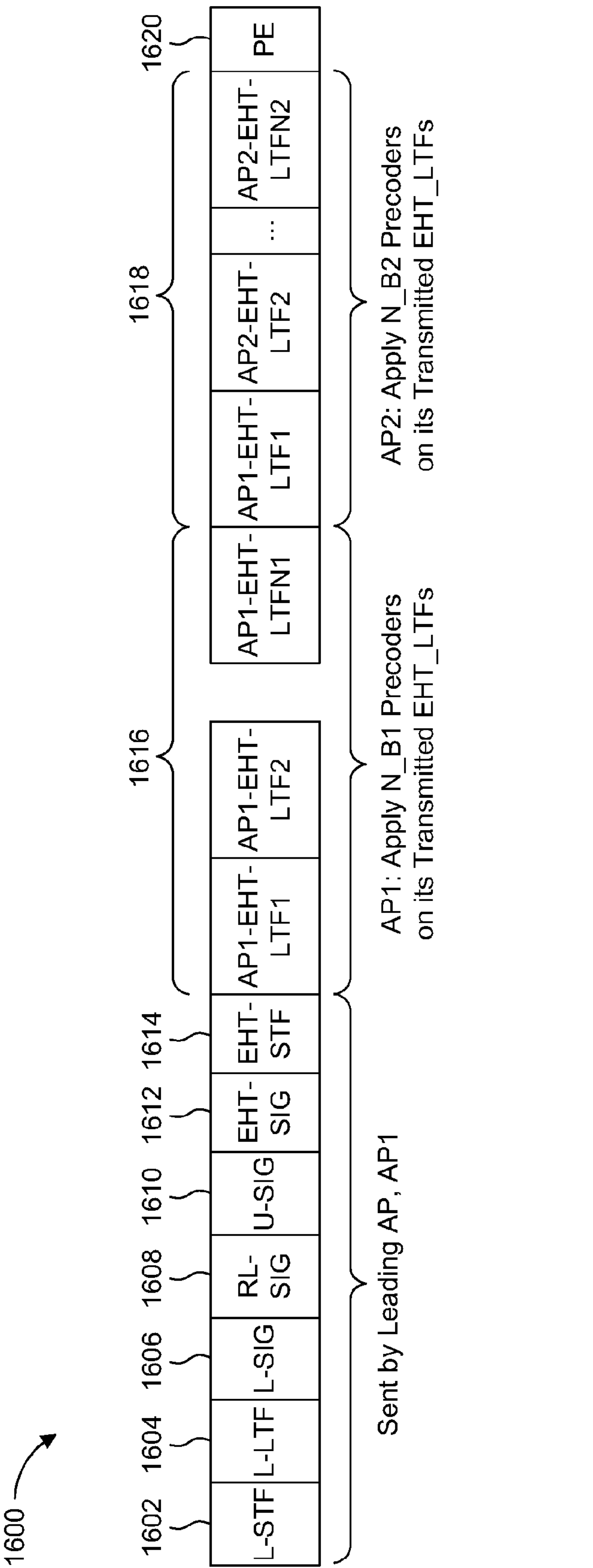
FIG. 16 illustrates an example of a single beamformed NDP structure for multi-AP sounding.

FIG. 16 illustrates an example of a single beamformed NDP frame 1600. The NDP frame 1600 may include a L-STF field 1602, L-LTF field 1604, L-SIG field 1606, RL-SIG field 1608, U-SIG field 1610, EHT-SIG field 1612, EHT-STF field 1614, one or more AP1-EHT-LTF fields 1616, one or more AP2-EHT-LTF fields 1618, and a PE field 1620. Fields 1602 to 1612 may be sent by a Leading AP or another AP.

Figure 17:
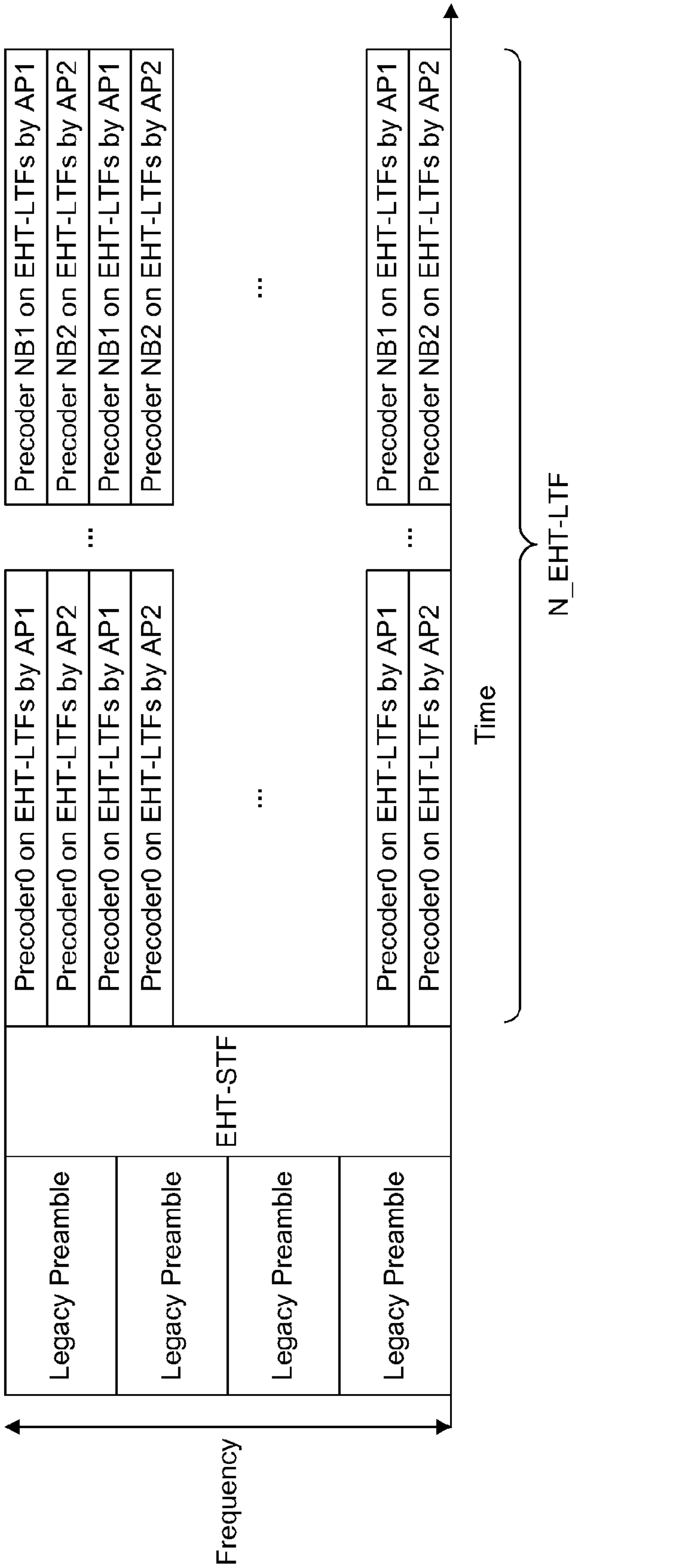
FIG. 17 illustrates an example of a single beamformed NDP packet structure with interleaved AP transmission of EHT-LTFs.

Interleaved AP transmissions may be used to reduce the number of EHT-LTFs in the MAP sounding protocol. As shown in FIG. 17, in one implementation, APs may send their EHT-LTFs in different tones. In this example, the total number of EHT-LTFs in single beamformed NDP is $N_{EHT-LTF}=N\times M$, where $$N = \max_{i\in(1,2,\ldots,N_{AP})} N_{SS-BF-NDP,i},\ M = \max_{i\in(1,2,\ldots,N_{AP})} N_{B_i}$$

Figure 18:
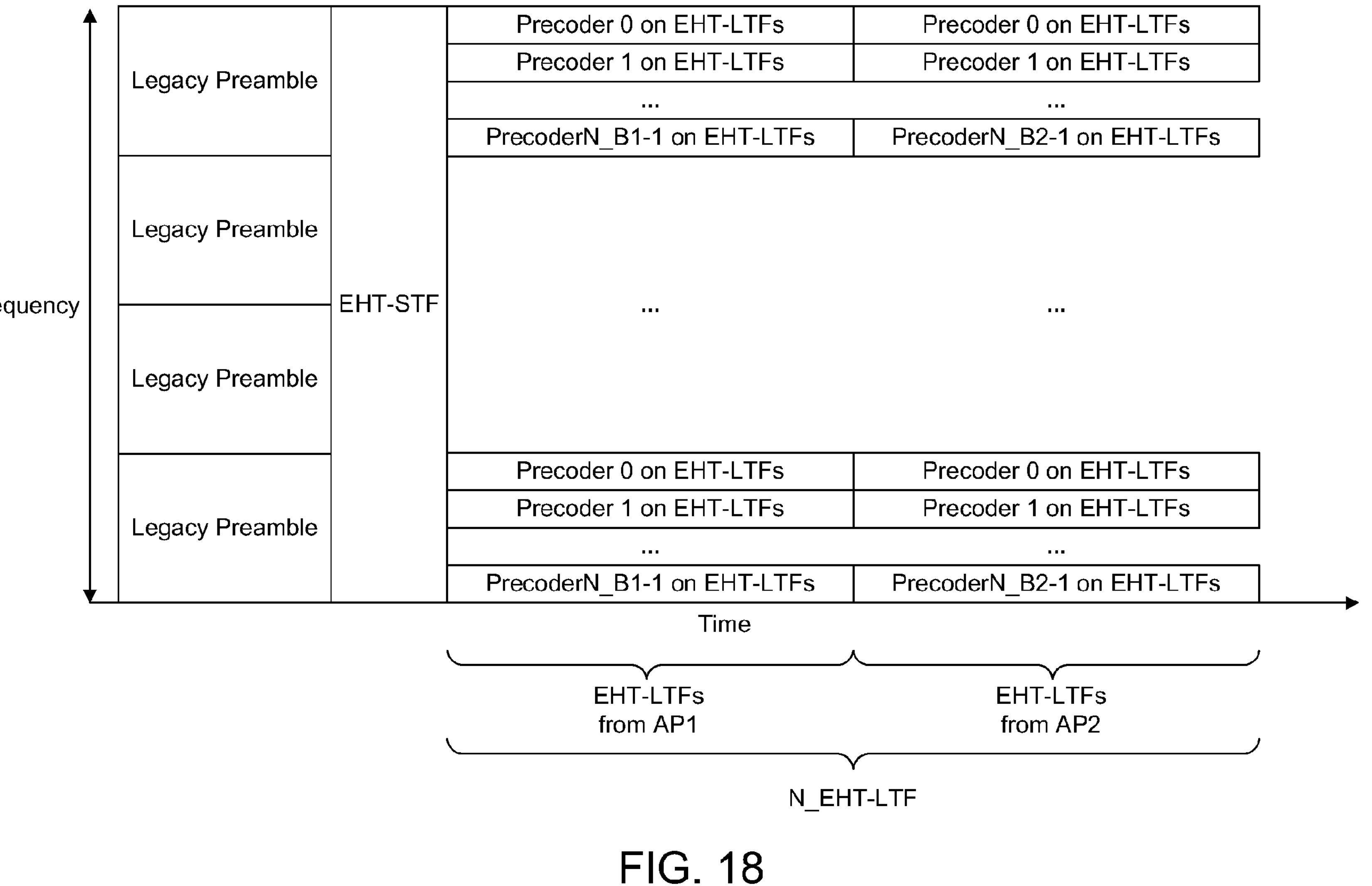
FIG. 18 illustrates an example of a single beamformed NDP packet structure with interleaved beam transmission of EHT-LTFs.

In another implementation, interleaved multi-beam transmissions may be used to reduce the number of EHT-LTFs in the MAP sounding protocol. In this implementation, As shown in FIG. 18, this method is to apply different precoders on EHT-LTFs from the same AP in different tones. In this example, the total number of EHT-LTFs in single beamformed NDP is $$N_{EHT-LTF} = \sum_{i=1}^{N_{AP}} N_{SS-BF-NDP,i}.$$

Figure 19:
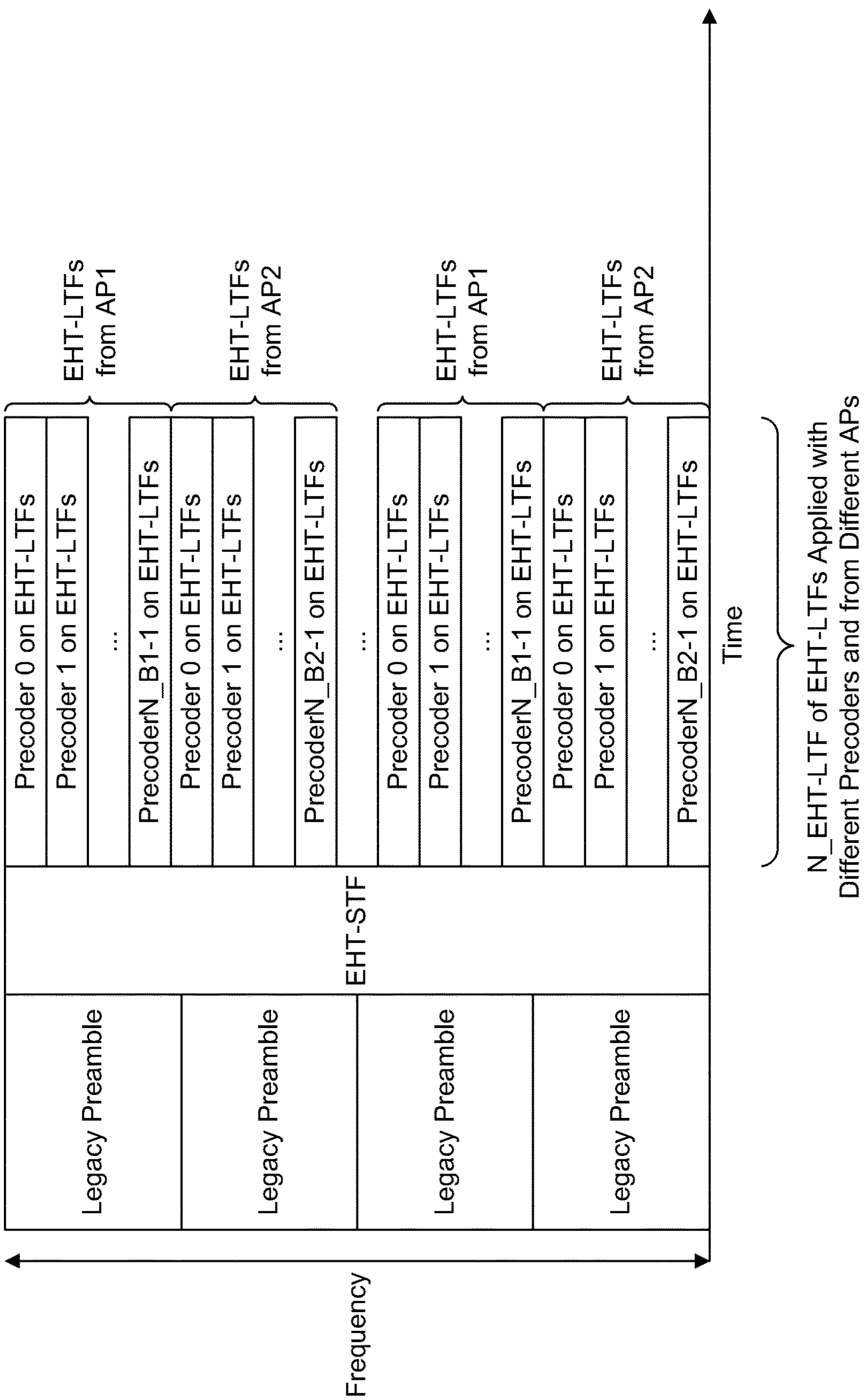
FIG. 19 illustrates an example of a single beamformed NDP packet structure with interleaved AP and beam transmission of EHT-LTFs.

In another implementation, interleaved multi-beam transmissions and AP transmission may be used to reduce the number of EHT-LTFs in the MAP sounding protocol. This implementation applies different precoders on EHT-LTFs from the different APs in different tones as shown in FIG. 19. In this example, the total number of EHT-LTFs in single beamformed NDP is $N_{EHT-LTF}=\max(M_1, M_2)$, where $$M_1 = \max_{i\in(1,2,\ldots,N_{AP})} N_{SS-BF-NDP,i},\ M_2 = \max_{i\in(1,2,\ldots,N_{AP})} N_{B_i}$$

In one embodiment, 2 bits in the EHT PHY Capabilities information field may be used to indicate the different MU beamformer capabilities in terms of bandwidth support. For example, B61 and B60 only are used to indicate the different MU Beamformer capabilities. When both bits (B61 and B60) are set to 0, it indicates the beamformer that is a MU beamformer, does no support 160 MHz channel width in the HE capabilities element and only supports for 80 MHz channel width; when bits (B61 and B60) are set to 0 1, it indicates that the beamformer that is a MU Beamformer and supports 160 MHz channel width; when bits (B61 and B60) are set to 10, it indicates that the beamformer that is a MU Beamformer and supports 320 MHz channel width. B62 may be reserved for other purposes. Alternatively, any other two bits from B60 and B62 may be used for the indication of MU Beamformer capabilities in terms of bandwidth support and one remaining bit is reserved for other usage.

In one embodiment, the STAs identified in the EHT NDP Announcement frame may be the same as the STAs triggered by the BFRP trigger frame(s) in the same TXOP of the EHT TB sounding sequence.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a beamformee, the method comprising:

receiving, from a beamformer, a null data packed (NDP) announcement frame (NDPA);

receiving, from the beamformer, based on the NDPA, an NDP frame;

receiving, from the beamformer, an enhanced beamforming request poll (BFRP) trigger frame including an indication of a feedback format; and transmitting, to the beamformer based on the NDP, using a format indicated by the feedback format of the BFRP trigger frame, a feedback frame including a feedback report.

2. The method of claim 1, wherein the trigger frame is an enhanced beamforming report poll (BFRP) trigger frame.

3. The method of claim 1, wherein the feedback report is a beamforming report.

4. The method of claim 1, wherein the feedback report is a vector index (VI) feedback report.

5. The method of claim 1, wherein the beamformer is an access point (AP).

6. The method of claim 1, wherein the beamformee is a station (STA).

7. The method of claim 1, wherein the feedback frame is further based on the NDPA.

8. The method of claim 2, wherein the BFRP includes a trigger dependent user info subfield.

9. A beamformee comprising:
- a processor
- a receiver; and
- a transmitter;
- the processor and the receiver configured to:
  - receive, from a beamformer, a null data packed (NDP) announcement frame (NDPA);
  - receive, from the beamformer, based on the NDPA, an NDP frame;
  - receive, from the beamformer, an enhanced beamforming request poll (BFRP) trigger frame including an indication of a feedback format; and
  - the processor and transmitter configured to transmit, to the beamformer based on the NDP, using a format indicated by the feedback format of the BFRP trigger frame, a feedback frame including a feedback report.

10. The beamformee of claim 9, wherein the trigger frame is an enhanced beamforming report poll (BFRP) trigger frame.

11. The beamformee of claim 9, wherein the feedback report is a beamforming report.

12. The beamformee of claim 9, wherein the feedback report is a vector index (VI) feedback report.

13. The beamformee of claim 9, wherein the beamformer is an access point (AP).

14. The beamformee of claim 9, wherein the beamformee is a station (STA).

15. The beamformee of claim 9, wherein the feedback frame is further based on the NDPA.

16. The beamformee of claim 10, wherein the BFRP includes a trigger dependent user info subfield.

17. A method performed by a beamformer, the method comprising:
- transmitting a null data packed (NDP) announcement frame (NDPA);
- transmitting a NDP frame;
- transmitting a first enhanced beamforming request poll (BFRP) trigger frame including an indication of a feedback format;
- receiving, from a first set of beamformees, one or more beamforming reports based on the indication of the feedback format;
- transmitting a second enhanced beamforming request poll (BFRP) trigger frame including an indication of a feedback format; and
- receiving, from a second set of beamformees, one or more feedback reports based on the indication of the feedback format.

18. The beamformer of claim 17, wherein the feedback report is a vector index (VI) feedback report.

19. The beamformer of claim 17, wherein the beamformer is an access point (AP).

20. The beamformer of claim 17, wherein the beamformee is a station (STA).

* * * * *